(12) United States Patent
Camarena-Vazquez

(10) Patent No.: US 11,519,688 B2
(45) Date of Patent: Dec. 6, 2022

(54) SPEARGUN

(71) Applicant: Guillermo Camarena-Vazquez, Las Vegas, NV (US)

(72) Inventor: Guillermo Camarena-Vazquez, Las Vegas, NV (US)

(*) Notice: Subject to any disclaimer, the term of this patent is extended or adjusted under 35 U.S.C. 154(b) by 0 days.

(21) Appl. No.: 17/206,391

(22) Filed: Mar. 19, 2021

(65) Prior Publication Data

US 2022/0299290 A1    Sep. 22, 2022

(51) Int. Cl.
| | | |
|---|---|---|
| *F41B 7/04* | (2006.01) | |
| *A01K 81/00* | (2006.01) | |
| *A01K 81/04* | (2006.01) | |
| *F41B 7/00* | (2006.01) | |

(52) U.S. Cl.
CPC ............... *F41B 7/04* (2013.01); *A01K 81/04* (2013.01); *F41B 7/003* (2013.01)

(58) Field of Classification Search
CPC ... F41B 7/00; F41B 7/003; F41B 7/04; A01K 81/00; A01K 81/04
USPC ............................. 124/17, 22, 26, 27; 43/6
See application file for complete search history.

(56) References Cited

U.S. PATENT DOCUMENTS

| | | | | |
|---|---|---|---|---|
| 3,016,891 A * | 1/1962 | Ebeling | ................. | A01K 81/00 43/6 |
| 3,509,863 A * | 5/1970 | Barker | ................... | F41B 7/003 124/31 |
| 4,895,128 A * | 1/1990 | Okada | .................... | A01K 81/00 124/31 |
| 5,243,955 A * | 9/1993 | Farless | ...................... | F41B 7/04 124/20.3 |
| 5,345,922 A * | 9/1994 | Ott | ............................ | F41B 3/02 124/16 |
| 6,273,078 B1 * | 8/2001 | Schwesinger | ............. | F41B 5/12 124/16 |
| 7,926,474 B2 * | 4/2011 | Berry | ..................... | A01K 81/06 124/20.3 |
| 8,312,869 B2 * | 11/2012 | Gillet | ..................... | A01K 81/06 124/20.3 |
| 8,544,455 B1 | 10/2013 | Bruington | | |
| 8,607,773 B1 * | 12/2013 | Schultz | ................... | F41B 5/123 124/56 |
| 9,243,864 B2 * | 1/2016 | Garofalo | ................ | A01K 81/00 |
| 9,612,080 B1 * | 4/2017 | Hachigian | ............. | A01K 81/00 |
| 10,422,606 B2 * | 9/2019 | Zournatzis | ................ | F41B 7/04 |
| 10,533,823 B1 * | 1/2020 | Smith | ....................... | F41B 7/04 |

(Continued)

FOREIGN PATENT DOCUMENTS

EP    1715284 A1    10/2006

*Primary Examiner* — Alexander R Niconovich
(74) *Attorney, Agent, or Firm* — Fitch, Even, Tabin & Flannery, LLP

(57) ABSTRACT

A speargun having a stock, a muzzle at a distal end thereof; and a pair of matching elastic tackles assemblies either side of the stock for tensioning a wishbone from the muzzle to a spear. Optionally, the speargun may have a second elastic tackle assembly disposed on the bottom of the stock. According to another approach, a speargun component kit may be provided to a user to attach to their own stock having a muzzle; a pair of tensionable pulley tackles having a line to attach a spear, to attach to the muzzle, and to attach to at least one pair of elastic bands at a second end; an adjustable anchor mount of the elastic bands to the stock, and a spear release mechanism.

11 Claims, 21 Drawing Sheets

(56) References Cited

U.S. PATENT DOCUMENTS

| | | | |
|---|---|---|---|
| 10,648,766 B2* | 5/2020 | Shaulov | F42B 6/02 |
| 2006/0243262 A1* | 11/2006 | Berry | A01K 81/06 |
| | | | 124/17 |
| 2009/0159065 A1* | 6/2009 | Moffitt | A01K 81/00 |
| | | | 124/71 |
| 2014/0318521 A1* | 10/2014 | Garofalo | F41B 11/83 |
| | | | 124/61 |
| 2015/0354916 A1* | 12/2015 | Polanich | F41B 7/04 |
| | | | 124/25.6 |
| 2016/0069634 A1* | 3/2016 | Zournatzis | F41B 7/04 |
| | | | 124/56 |
| 2019/0323793 A1* | 10/2019 | Shaulov | F42B 6/02 |
| 2020/0278169 A1* | 9/2020 | Shaulov | A01K 81/04 |
| 2022/0065581 A1* | 3/2022 | Zournatzis | F41B 7/04 |

* cited by examiner

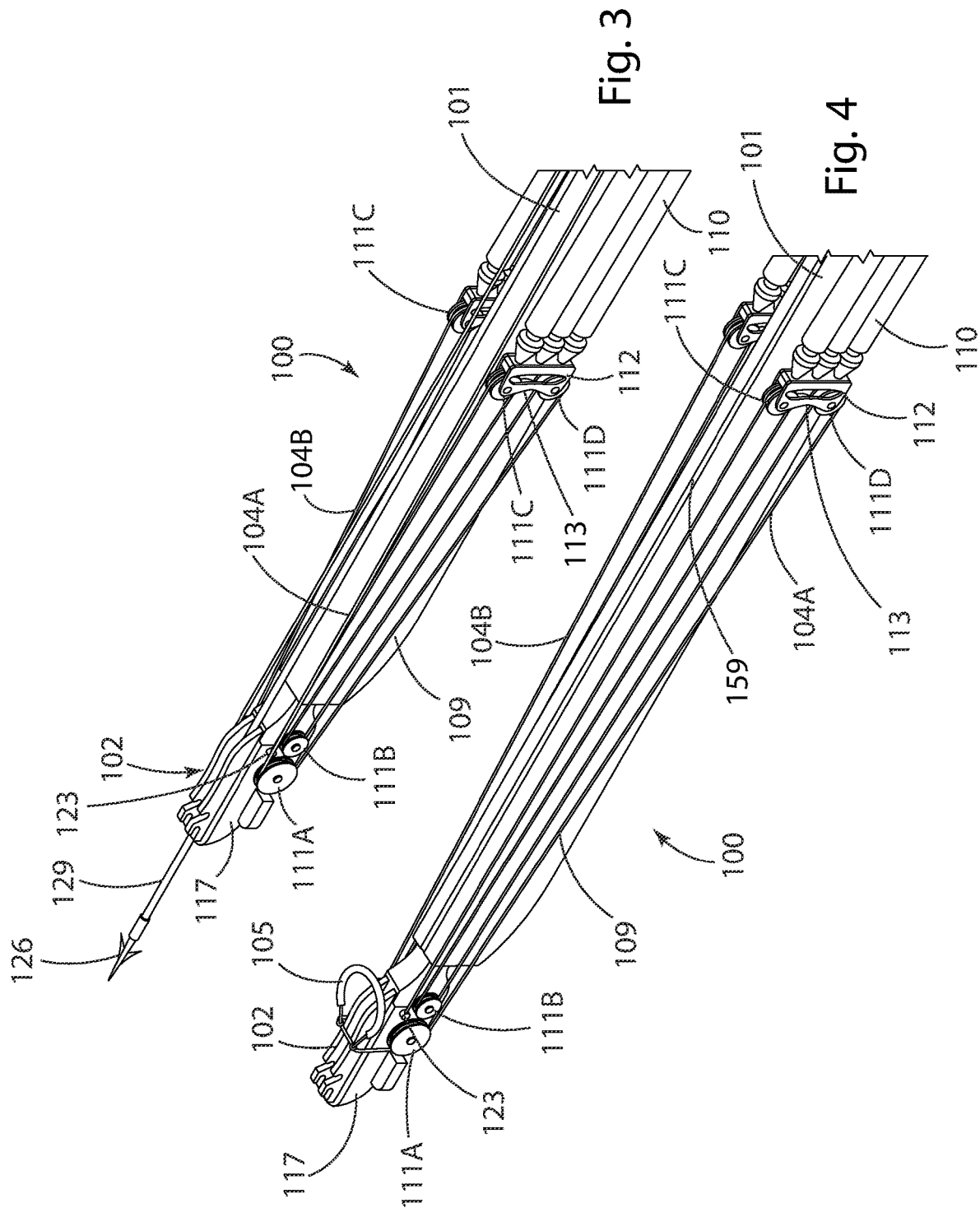

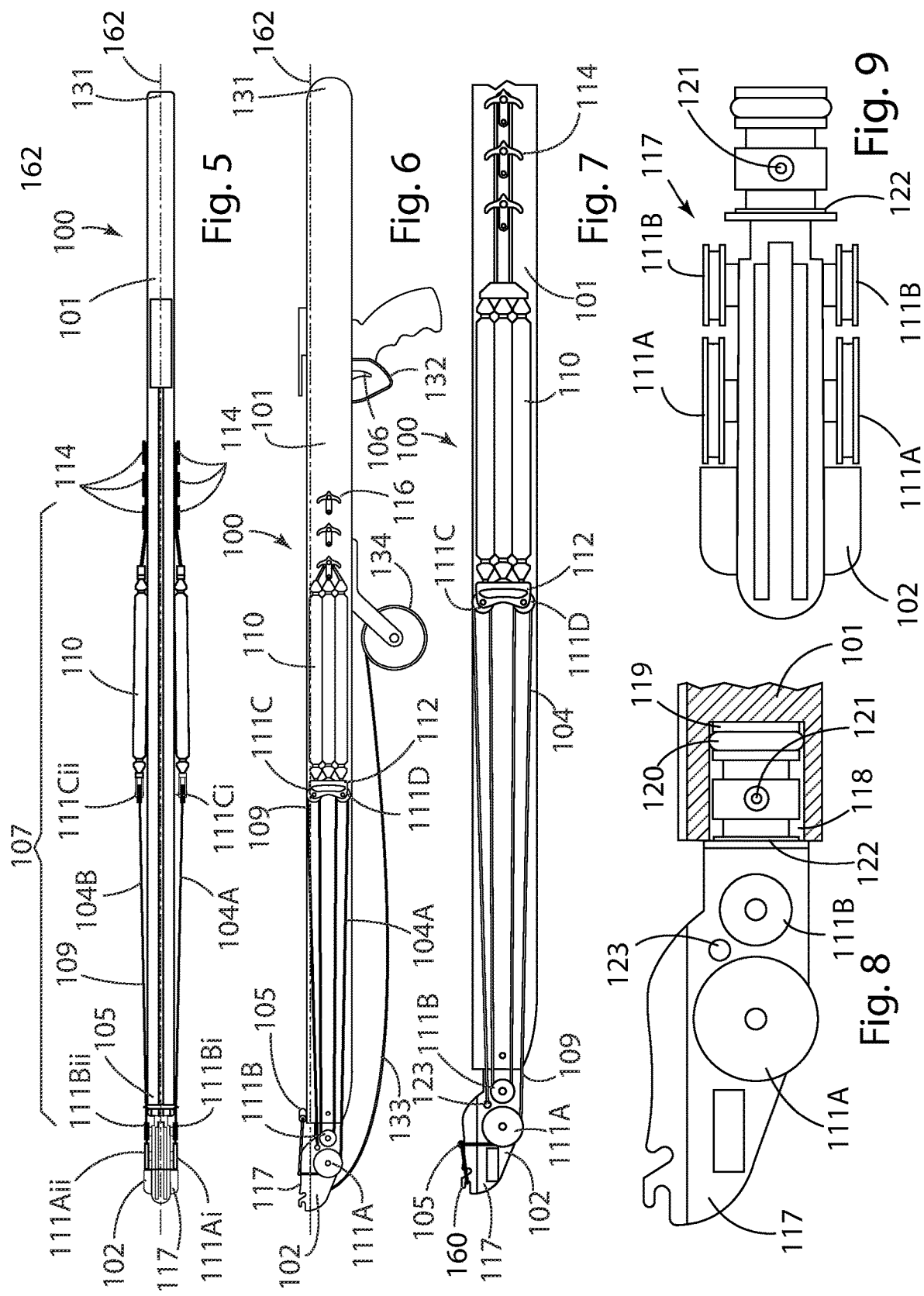

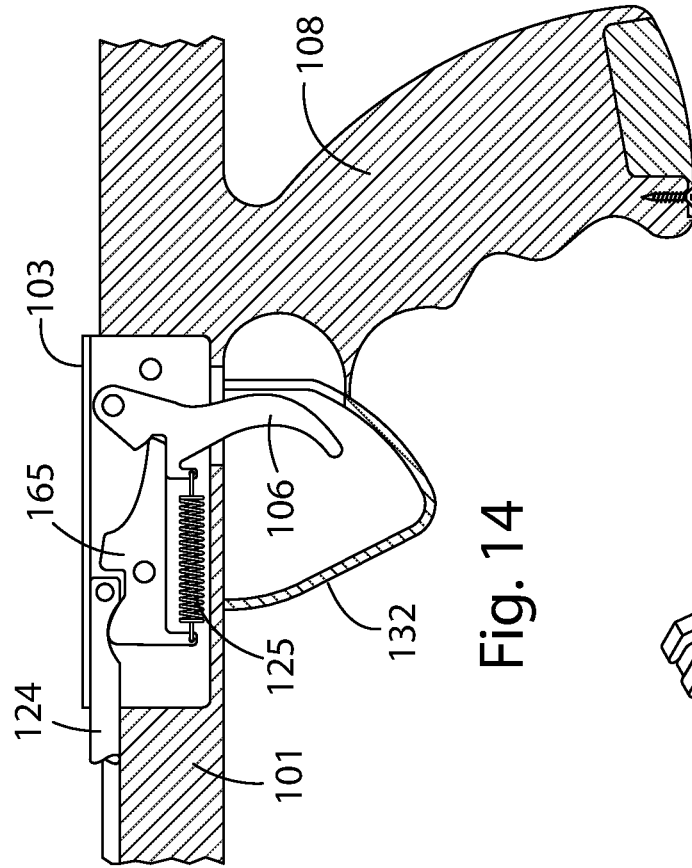
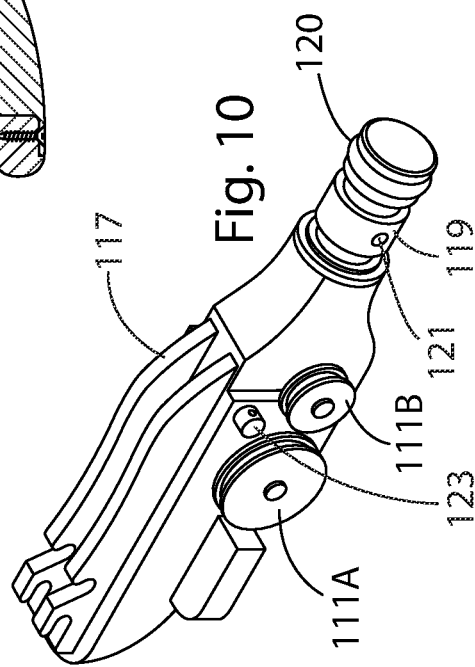
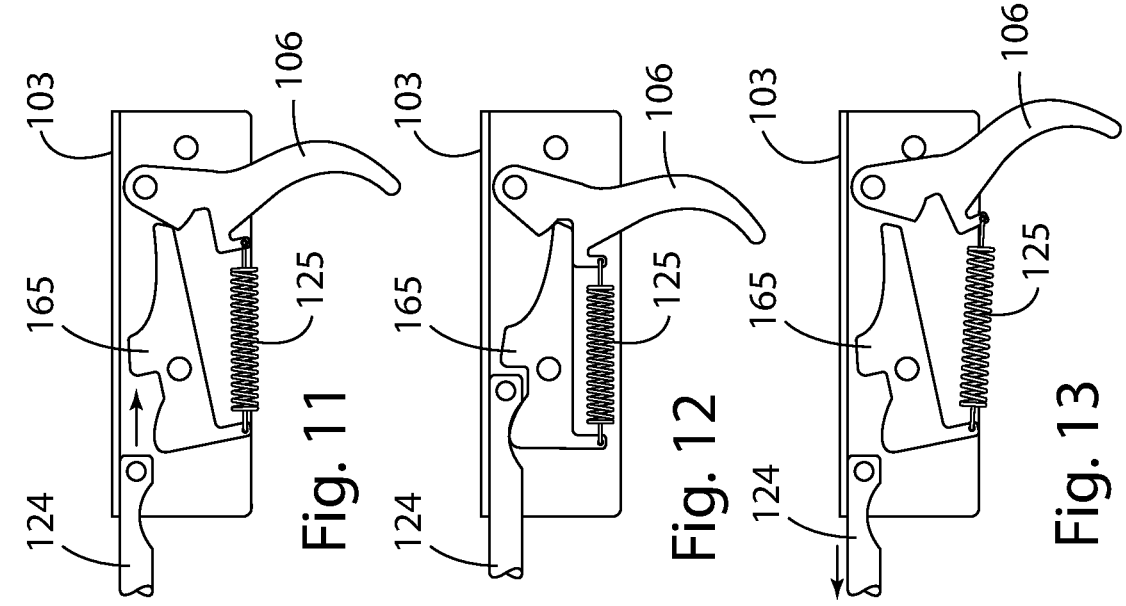

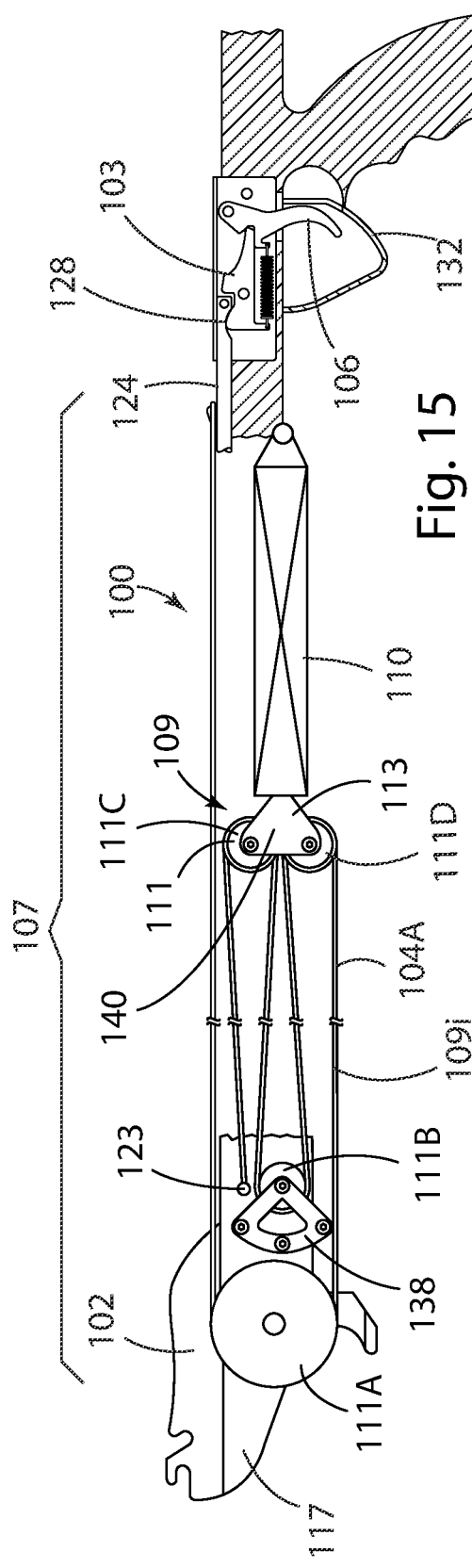
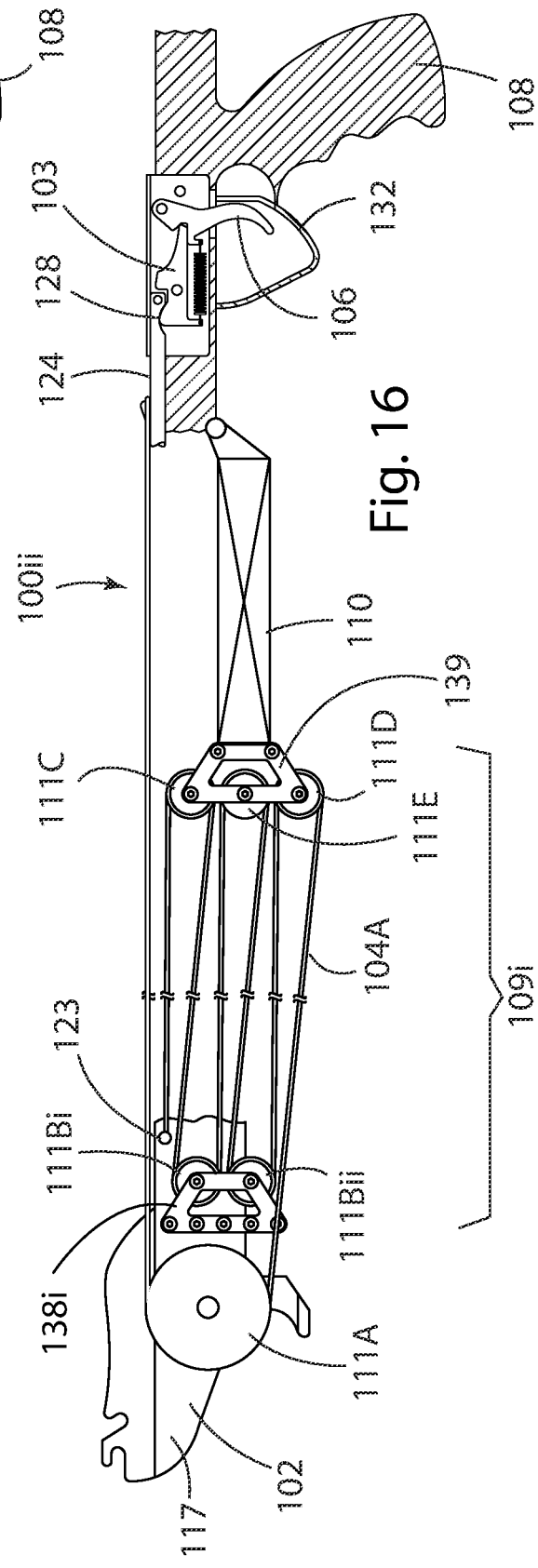
Fig. 15
Fig. 16

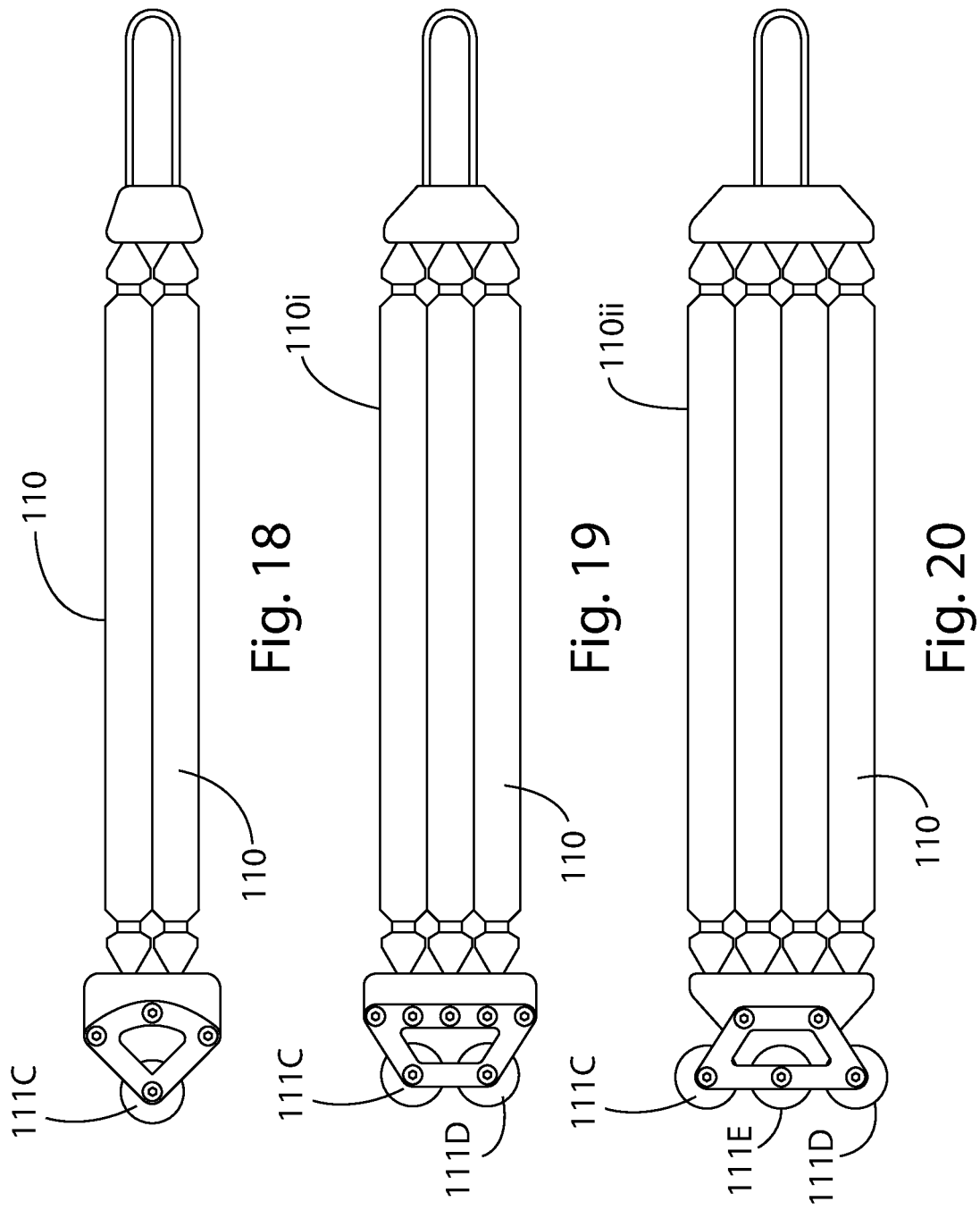

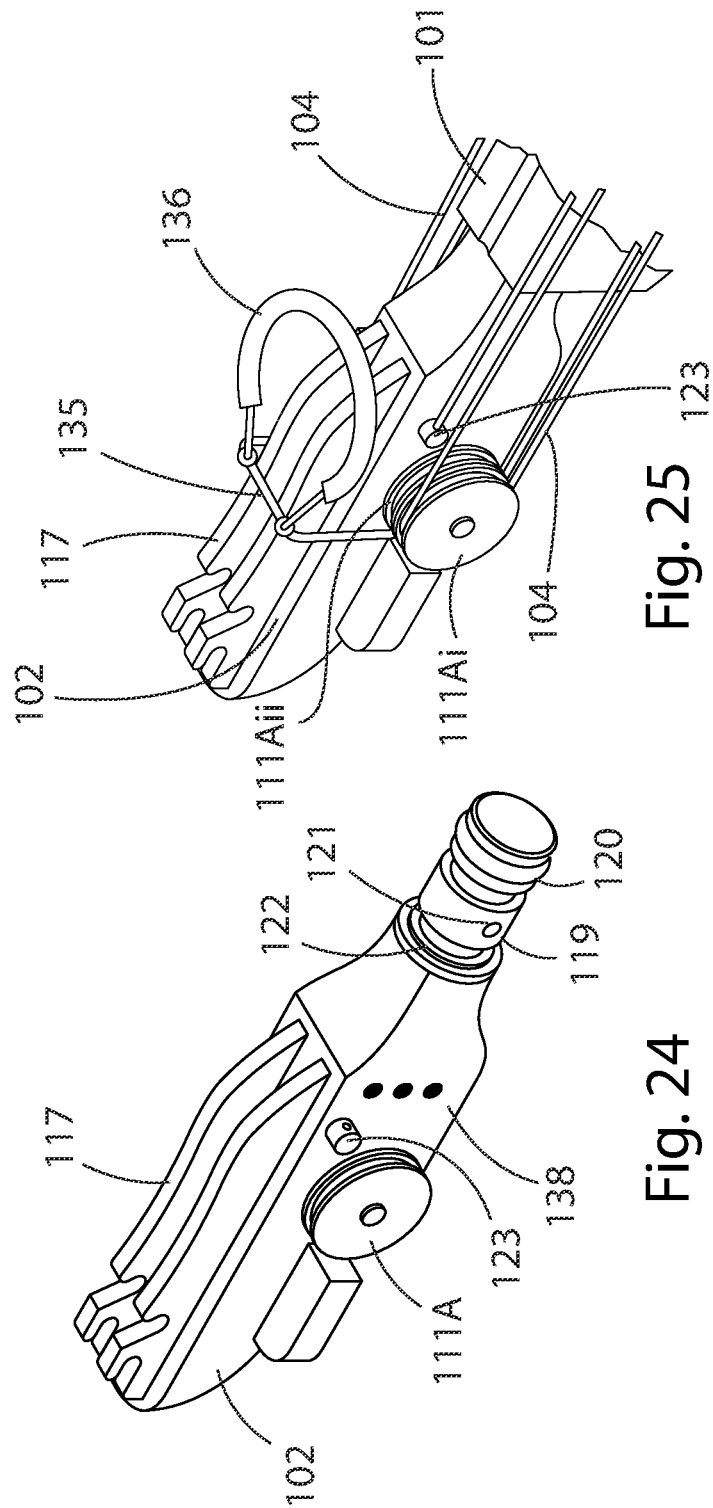

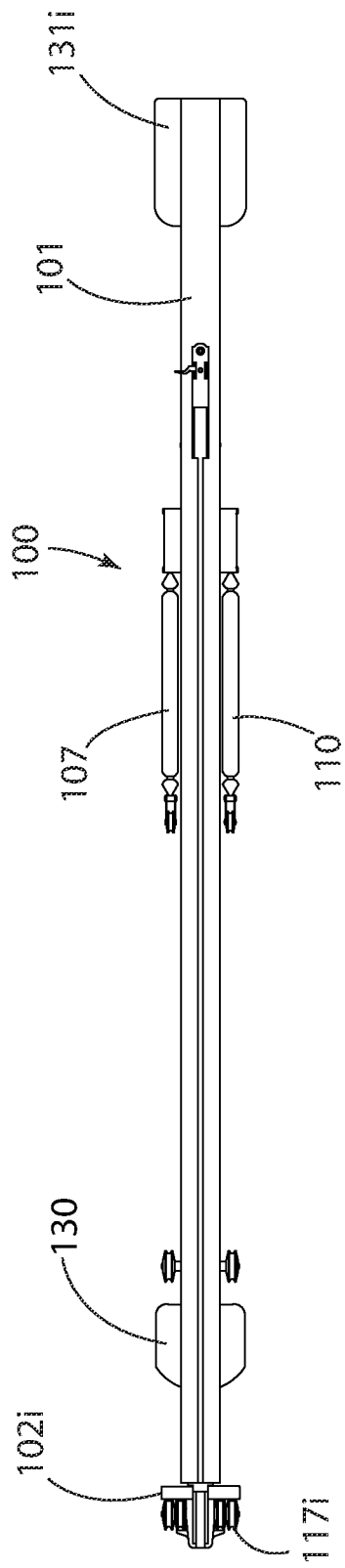
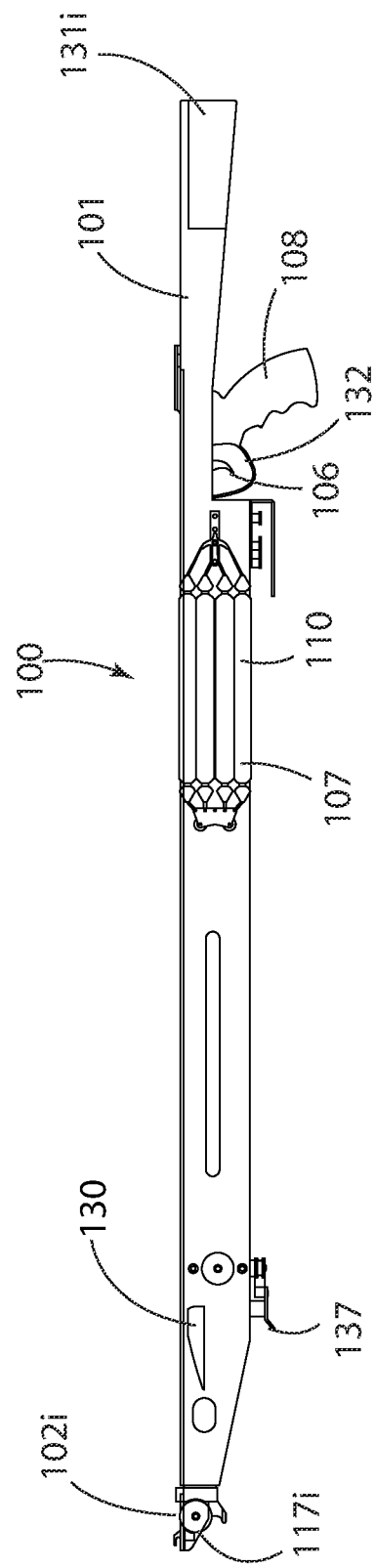

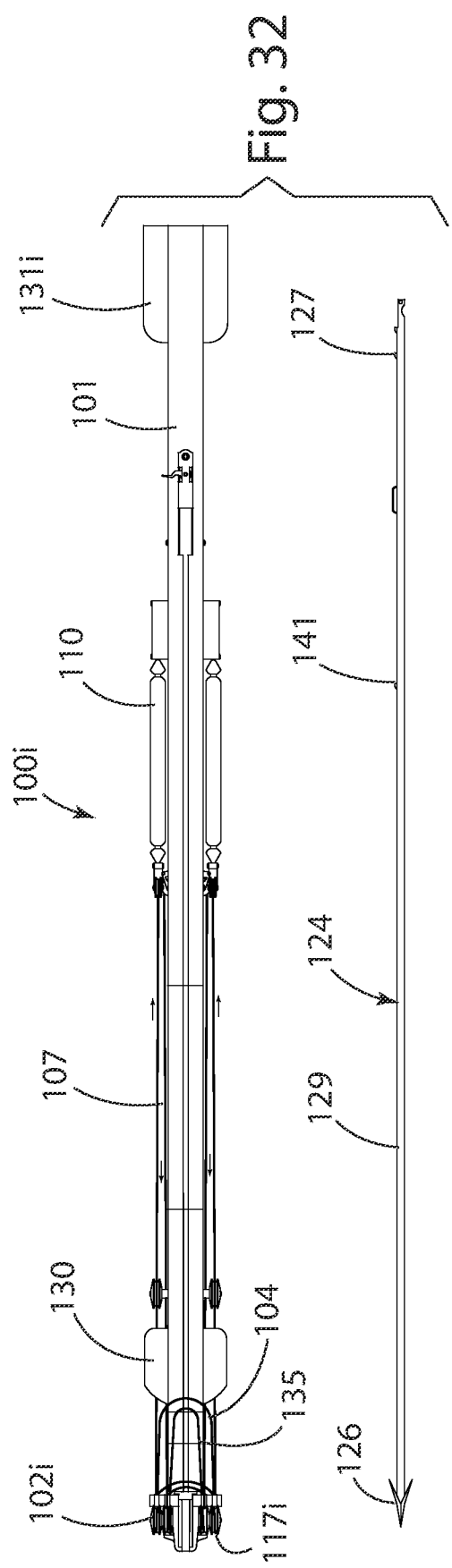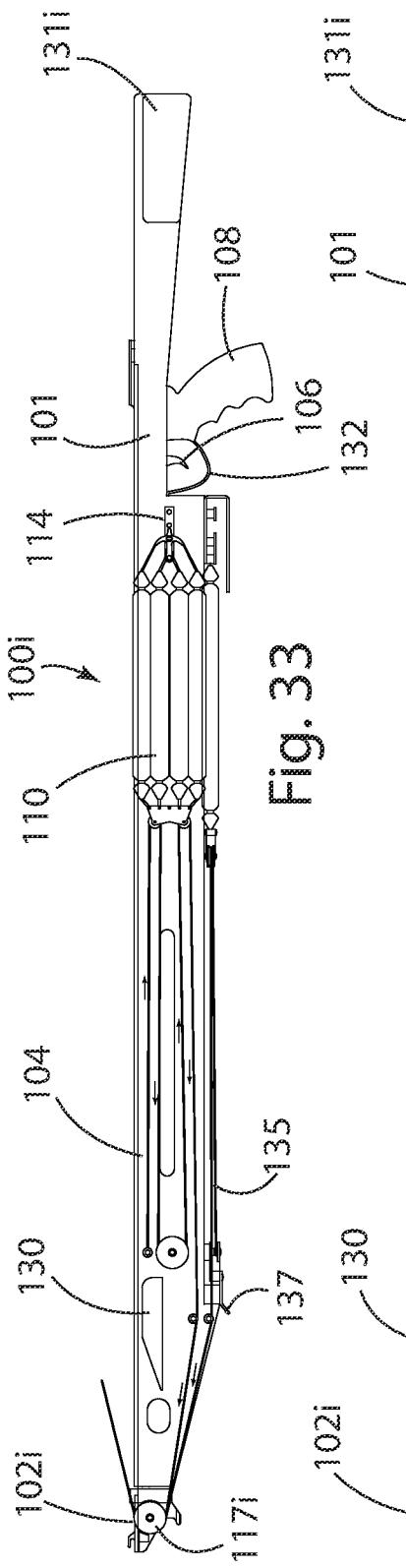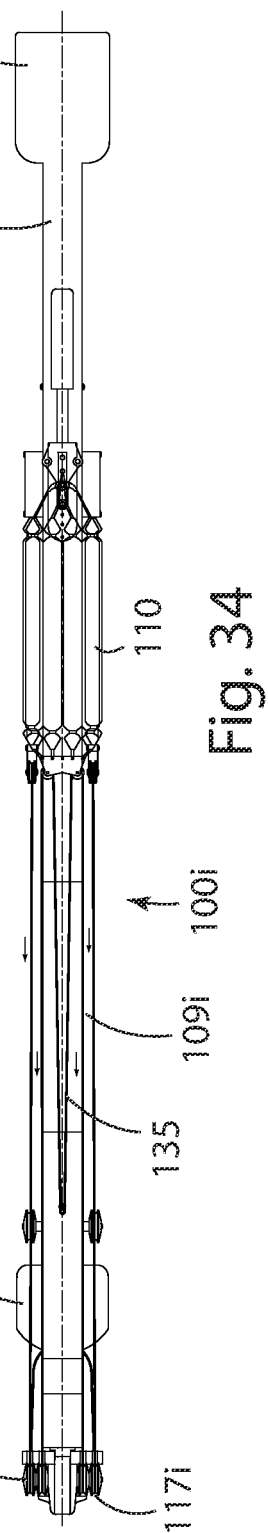

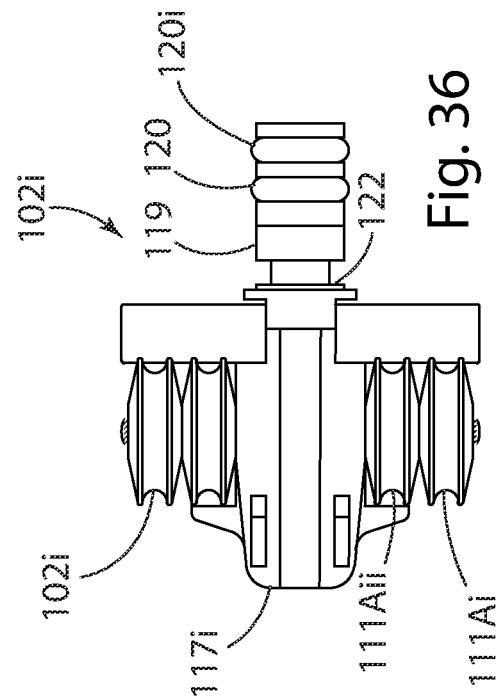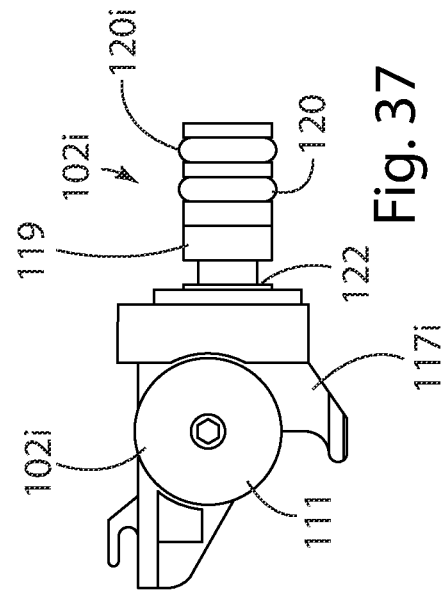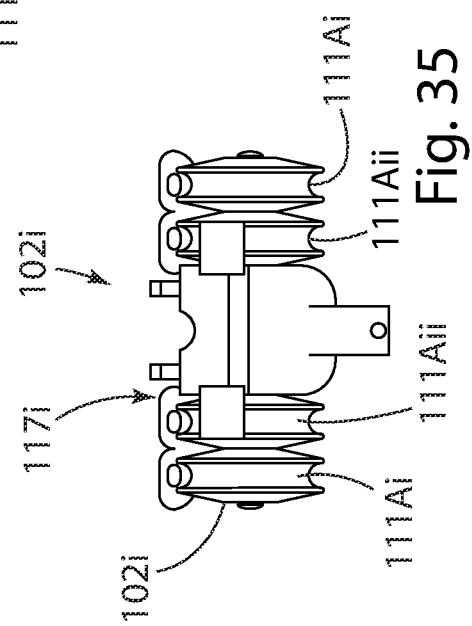

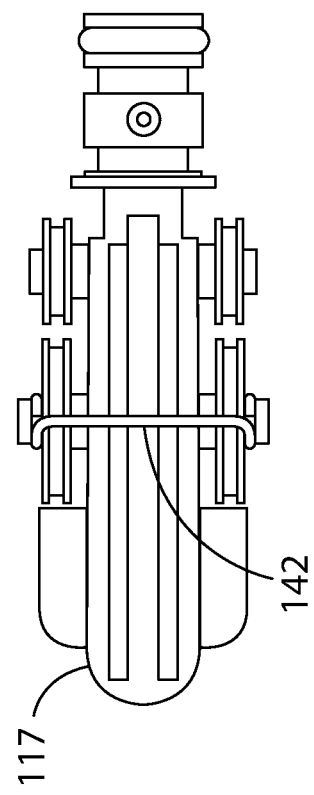
Fig. 38
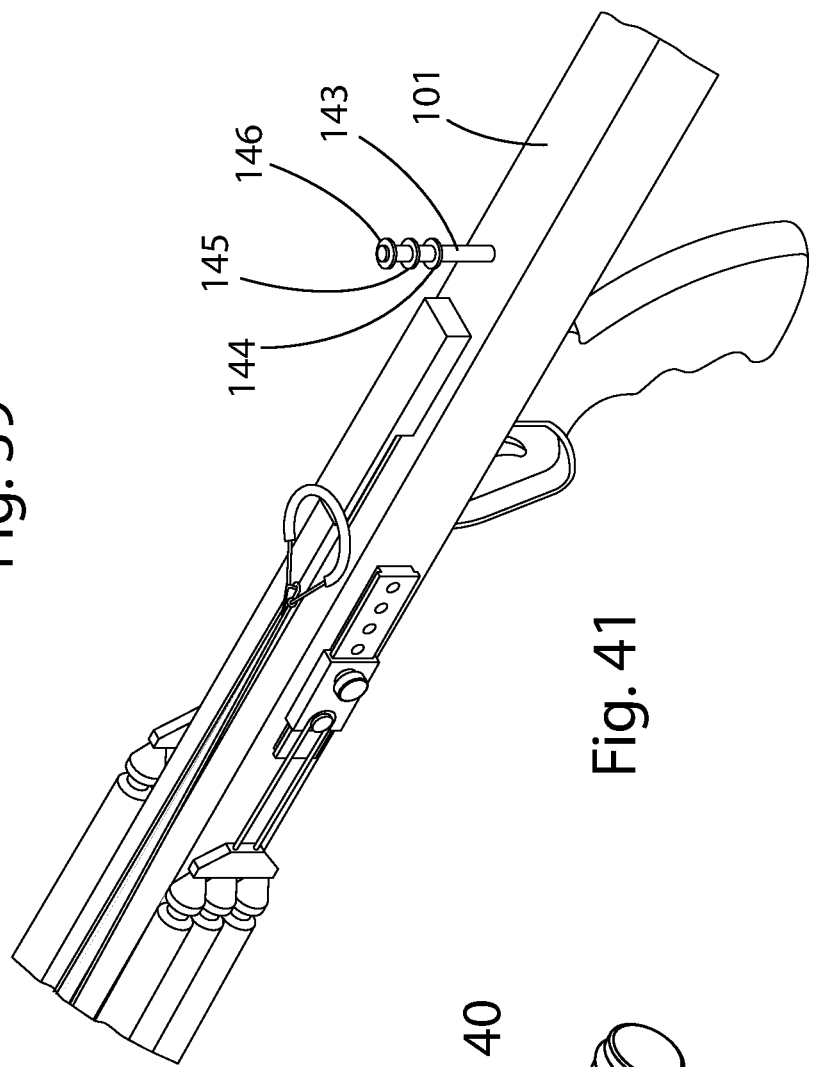
Fig. 39
Fig. 41
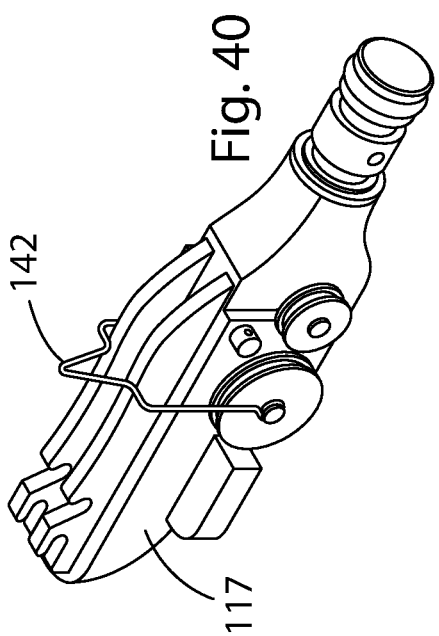
Fig. 40

SPEARGUN

FIELD

Presented herein are speargun assemblies and methods, and in particular spearguns methods having laterally oriented (side-by-side) elastic tackles.

BACKGROUND

A speargun is an underwater fishing device which launches a spear at fish or other targets. Spearguns may be powered pneumatically or by rubber bands. Band powered spearguns propel a spear forward by heavy elastic bands (e.g., latex) which may produce approximately 50 to 125 pounds of thrust per band. Pneumatic spearguns use a compressed air piston to propel the spear forward. Band powered spearguns typically have a grip or handle, a trigger mechanism, a barrel or stock of wood, metal or composite, a muzzle, a butt, a spear, a line tether which attaches to the spear, and bands to propel the spear. (See generally, U.S. Pat. No. 8,544,455 to Bruington).

Despite recent advances in the art, for instance in stronger triggering mechanisms, muzzle pulleys (See generally, U.S. Pat No. 3,016,891 to Ebeling), and closed loop rubber bands with a pair of muzzle pulleys (See generally, EP1715284 to Katapotis) additional improvements are possible and desired. For example, there remains a desire and a need in the art to provide more power to propel the spear without detectable recoil.

It is to be understood that if any prior art information is referred to herein, such reference does not constitute an admission that the information forms part of the common general knowledge in the art.

SUMMARY

Accordingly, to advance at least the aforementioned deficiencies in the art, described herein are assemblies to provide an improved speargun, which will overcome or substantially ameliorate at least some of the deficiencies of the prior art, or to at least provide an alternative.

There is provided herein a speargun comprising a stock, a muzzle at a distal end thereof and elastic tackles either side of the stock tensioning a wishbone line from the muzzle. Each elastic tackle comprises a tackle comprising a plurality of pulleys acting on a line and a block which is pulled by one or more elastic bands anchored to the stock.

The side placement of the elastic tackles lie symmetrically about a central longitudinal axis of the stock as opposed to on top or underneath as per conventional arrangements which reduces or eliminates bending of the stock, which may allow for increased length thereof without bending. The symmetrically also reduces or eliminates recoil thereby enhancing shooting accuracy.

The line goes through a distal pulley at the muzzle which allows the wishbone to go almost right to the end of the gun, thereby reducing the overall length of the gun.

Each elastic tackle preferably comprises a four-pulley tackle conferring a fourfold reduction in tension which can therefore be more easily reloaded in use.

Furthermore, the present elastic tackles require the elastic thereof to be stretched only to approximately 100-200% as compared to conventional spearguns which normally stretch unitary elastic bands thereof up to 300%, thereby allowing for an overall reduction in the length of the present stock.

Power of each elastic tackle may be increased by including a plurality of elastic bands in parallel such as by using three parallel elastic bands each side of the stock.

The elastic bands may connect to the stock and one of a plurality of available connection points to adjust the pretension of the elastic bands.

The muzzle is preferably formed by a muzzle piece separable from the stock. In this regard, the stock may be wooden and a distal blind hole within which a portion of the mantelpiece is retained. The muzzle piece may have distal pulleys of the elastic tackles so that the present gun may be assembled relatively easily by connecting the muzzle piece the distal end of the stock and attaching the elastic bands to the sides thereof.

According to one approach a speargun is provided having a stock, a muzzle at a distal end thereof; and a pair of matching elastic tackles assemblies either side of the stock for tensioning a wishbone from the muzzle to a spear. Optionally, the speargun may have a second elastic tackle assembly disposed on the bottom of the stock.

According to another approach, a speargun component kit may be provided to a user to attach to their own stock having a muzzle; a pair of tensionable pulley tackles having a line to attach a spear, to attach to the muzzle, and to attach to at least one pair of elastic bands at a second end; an adjustable anchor mount of the elastic bands to the stock, and a spear release mechanism.

Other aspects of the invention are also disclosed and will become more apparent to persons having ordinary skill in the art to which the assemblies pertain and from the following description and claims.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 3 illustrates a partial closeup perspective view of a distal portion of a speargun in accordance with the present embodiment of FIG. 1 with the tackle line in a cocked position;

FIG. 4 illustrates a partial closeup perspective view of a distal portion speargun in accordance with the present embodiment of FIG. 1 with the tackle line in a released position;

FIG. 5 illustrates a top plan view of the speargun in accordance with the present embodiment of FIG. 1;

FIG. 6 illustrates a side elevation view of a speargun in accordance with the present embodiment of FIG. 1 with an attached spear line spool;

FIG. 7 illustrates a partial side elevation view of a speargun in accordance with the present embodiment of FIG. 1;

FIG. 8 illustrates a side elevation view of a speargun muzzle in accordance with the present embodiment of FIG. 1;

FIG. 9 illustrates a top plan view of speargun muzzle in accordance with the present embodiment of FIG. 1;

FIG. 10 illustrates a perspective view of speargun muzzle in accordance with the present embodiment of FIG. 1;

FIG. 11 illustrates a side elevation view of a speargun trigger assembly in accordance with the present embodiment of FIG. 1 being loaded with a spear;

FIG. 12 illustrates a side elevation view of a speargun trigger assembly in accordance with the present embodiment of FIG. 1 loaded with a spear;

FIG. 13 illustrates a side elevation view of a speargun trigger assembly in accordance with the present embodiment of FIG. 1 with the trigger tripped;

FIG. 14 illustrates a side elevation cutaway view of a speargun handle and trigger assembly in accordance with the present embodiment of FIG. 1 cocked with a spear;

FIG. 15 illustrates a side elevation view of a speargun according to another approach with one each side a one pully tackle for pulley 111B and a two pulley tackle for pulleys 111C and 111D;

FIG. 16 illustrates a side elevation view of a speargun in according to another approach with one each side a two pully tackle for pulley 111Bi and 111Bii and a three pulley tackle for pulleys 111C, 111D and 111E;

FIG. 18 illustrates a side elevation view of a speargun with the elastic tackle according to one approach;

FIG. 19 illustrates a side elevation view of a speargun with the elastic tackle according to another approach;

FIG. 20 illustrates a side elevation view of a speargun with the elastic tackle according to another approach;

FIG. 24 illustrates a close up perspective view of a speargun muzzle in accordance with another approach of the present embodiments;

FIG. 25 illustrates a close up perspective view of a speargun muzzle in accordance with another approach of the present embodiments;

FIG. 27 illustrates a top plan view of the speargun in accordance with another approach of the present embodiments;

FIG. 28 illustrates a side elevational view of the speargun in accordance with the embodiment of FIG. 27;

FIG. 32 illustrates an exploded top plan view of the speargun in accordance with another approach of the present embodiments;

FIG. 33 illustrates a side elevational view of the speargun in accordance with the embodiment of FIG. 32;

FIG. 34 illustrates a bottom plan view of the speargun in accordance with the embodiment of FIG. 32;

FIG. 35 illustrates a bottom plan view of a speargun muzzle in accordance with another approach of the present embodiments;

FIG. 36 illustrates a top plan view of a speargun muzzle in accordance with the embodiment of FIG. 35;

FIG. 37 illustrates a side elevational view of a speargun muzzle in accordance with the embodiment of FIG. 35.

FIG. 38 illustrates a side elevational view of a speargun muzzle with an optional front site.

FIG. 39 illustrates a top view of a speargun muzzle with the optional front site of FIG. 38.

FIG. 40 illustrates a top perspective view of a speargun muzzle with the optional front site of FIG. 38.

FIG. 41 illustrates a top perspective view of a speargun muzzle with an the optional rear site compatible with the front site of FIG. 38.

Figure 1:
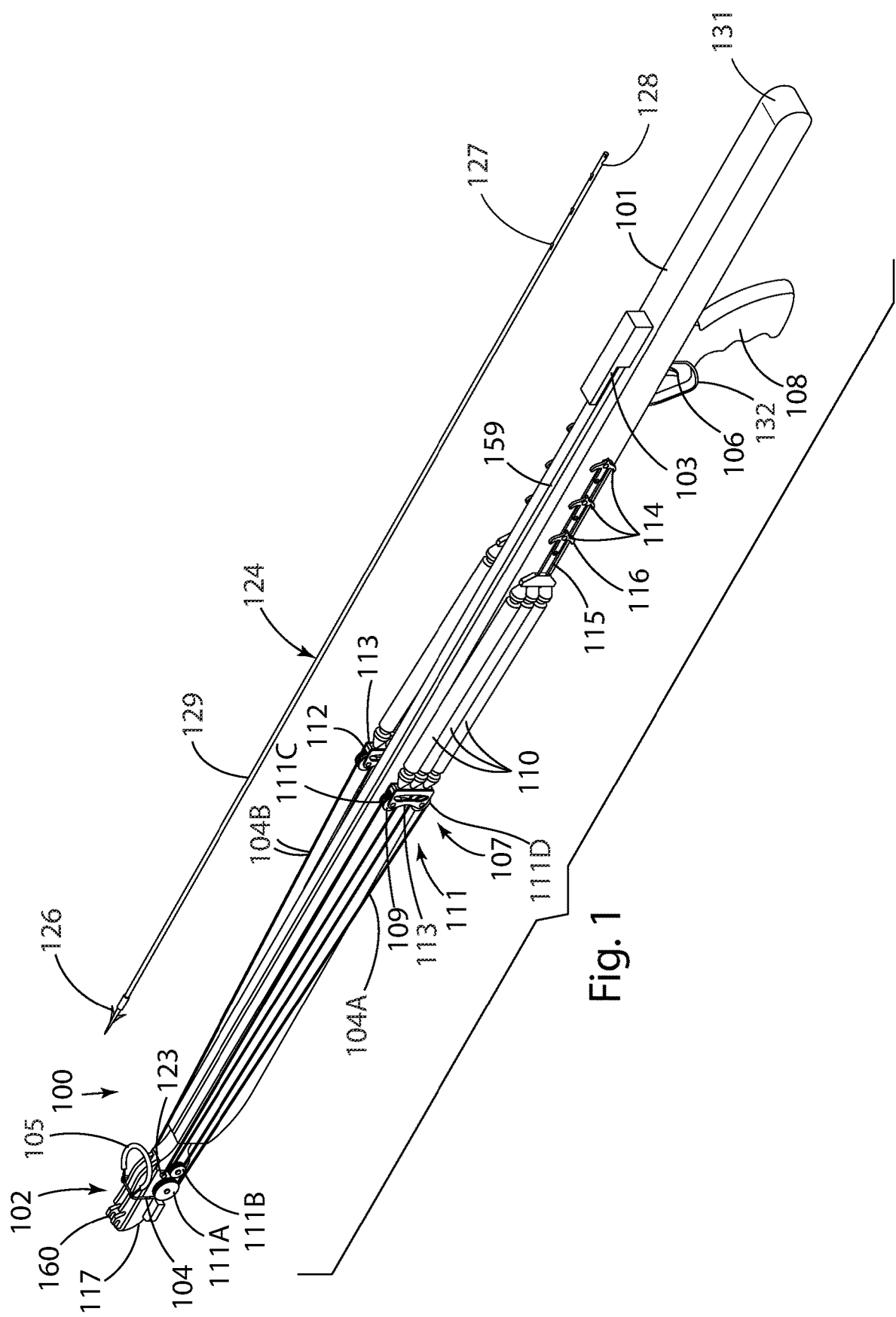
FIG. 1 illustrates an exploded perspective view of a speargun in accordance with one of the present embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by at least the appended claims.

DETAILED DESCRIPTION

Presented herein are speargun assemblies and methods, and in particular spearguns methods having laterally oriented (side-by-side) elastic tackles of lines, pulleys and elastic bands. Advantages of such bilateral tackle systems is to direct tension along the longitudinal axis of the stock. The balanced bi-lateral forces provided by the bands result in reduce lateral pressures on the stock which have been known to bend or warp a stock in all directions. Thus, the bilateral tackles balance the tension on the stock to reduce/eliminate tension deflection from one side or the other as found in current speargun tackle configurations. This allows for a longer wooden stock without the eventual and inevitable warping after prolonged use. Longer stock leads to greater accuracy and longer product life and the use of wood and other lighter substances for the stock since the tension from the tackles is a compressive force along the longitudinal axis 162 (See e.g., FIGS. 5 and 6).

Additionally, the recoil of the speargun when "fired" (i.e., the triggering mechanism releases the elastic tension of the stretched elastic bands to return to their unstretched/unextended state) to propel a projectile such as a spear, an arrow and the like is significantly reduced/eliminated because of the balance of the equal side-by-side bi-lateral tackle assemblies.

The present embodiments show many improvements over spearguns known in the art. They are easy to load given the pulley tackle systems. Using a system of pulleys provide a powerful mechanical advantage by greatly reducing the amount of force required to add elastic tension to the bands. For example, if one pulley is used, the amount of user force required to stretch an elastic band is reduced by about 50 percent. Given this mechanical advantage, multiple and bi-lateral bands may be harnessed to a single load.

The present embodiments provide multiple and improved set-up configurations. The present configurations allow quick setup times and provide the option to add and reduce pairs of pulleys such as 1, 2, 3 or 4 pulleys balanced to each side of the speargun, as will be shown in the figures. The same applies to the elastic bands in that Rubber Pretention options in that the present configurations provide the option to add and reduce pairs of bands.

Muzzle head pulley setups can be configured to be swapped out to adjust to user desired additional pulley configurations. Multiple and variable muzzle head load options are included, including double side pulley system, for double roller line systems (See e.g., FIG. 26). The pulleys on the Muzzle head can be quickly changed by removing a pin (for example, a 10 mm pin), which passes through the muzzle head and pins both left and right pulleys to the muzzle head. Customized pulley brackets and quick release attachments to the stock allows an easy transition from, for example, a one, two or three additional pulleys on the muzzle head. In FIG. 1, the main muzzle head pulley extends out past the pulley options. O rings may be used (See e.g., ref. 120 FIG. 8) to give the muzzle head a very tight fit into the stock. In stocks made from metals (e.g., aluminum) or composites, these O rings seal the hollow stock. Muzzle 102 may also have a hook 160 (See e.g., FIG. 1).

A variety of tensioning options are possible within the scope of the present embodiments. Rubber or latex configurations may be used. One such band known in the art is sold under the tradename CETMA 14~19 mm Bulk Magnum Plus Rubber Band made from pure latex. Such bands only need only 100 percent stretch to achieve same power as 300 percent stretch of natural rubber. Latex bands are highly elastic with extra high stretch factor. For example, bands for use with the present embodiments may be latex bands having four layers: iridescent metallic copper to match the surrounding environment; a second layer to block UV rays from penetrating the rubber and deteriorating the internal natural latex over time; a third layer of high modulus natural rubber that can function as a knot resistor to enhance durability of the rubber band; and a fourth layer of pure natural Latex rubber. With a layered structure pure Latex can be used at the core of the rubber band without the use of any additives which are found in traditional rubber bands and compromise the performance of natural Latex. A smaller internal hole diameter than traditional rubber bands (0.9 mm) can allow for a greater quantity of pure Latex material without increasing the overall diameter of the rubber band - thus providing higher power output at the same rubber band diameter. According, such elastic bands has capacity to store the tension load for long time at high elongation (e.g., at up to 350 percent elongation). For optimal stability and performance the present embodiments have a preferred 300 percent elongation. It is noted that compressive and extensive springs may also be considered to provide tension to propel a projectile (hereinafter "spear"). This improved diminished recoil allows a user more accuracy to hit a desired target as well as allows less experienced speargun users a faster learning curve for successful use.

For the stock of the present embodiments, a user may select most any type of wood (does not need to be hardwood). By way of example only, pine wood with coated protection may be used. This allows for configurations with longer stocks and customizations. For example, a kit form of the present embodiments allows a user to make or use their own stock and attach the kit components (i.e., the components described herein minus the stock) to their desired customization. The stock may be hollow but does not need to be. For example, a wood stock already is buoyant.

Figure 2:
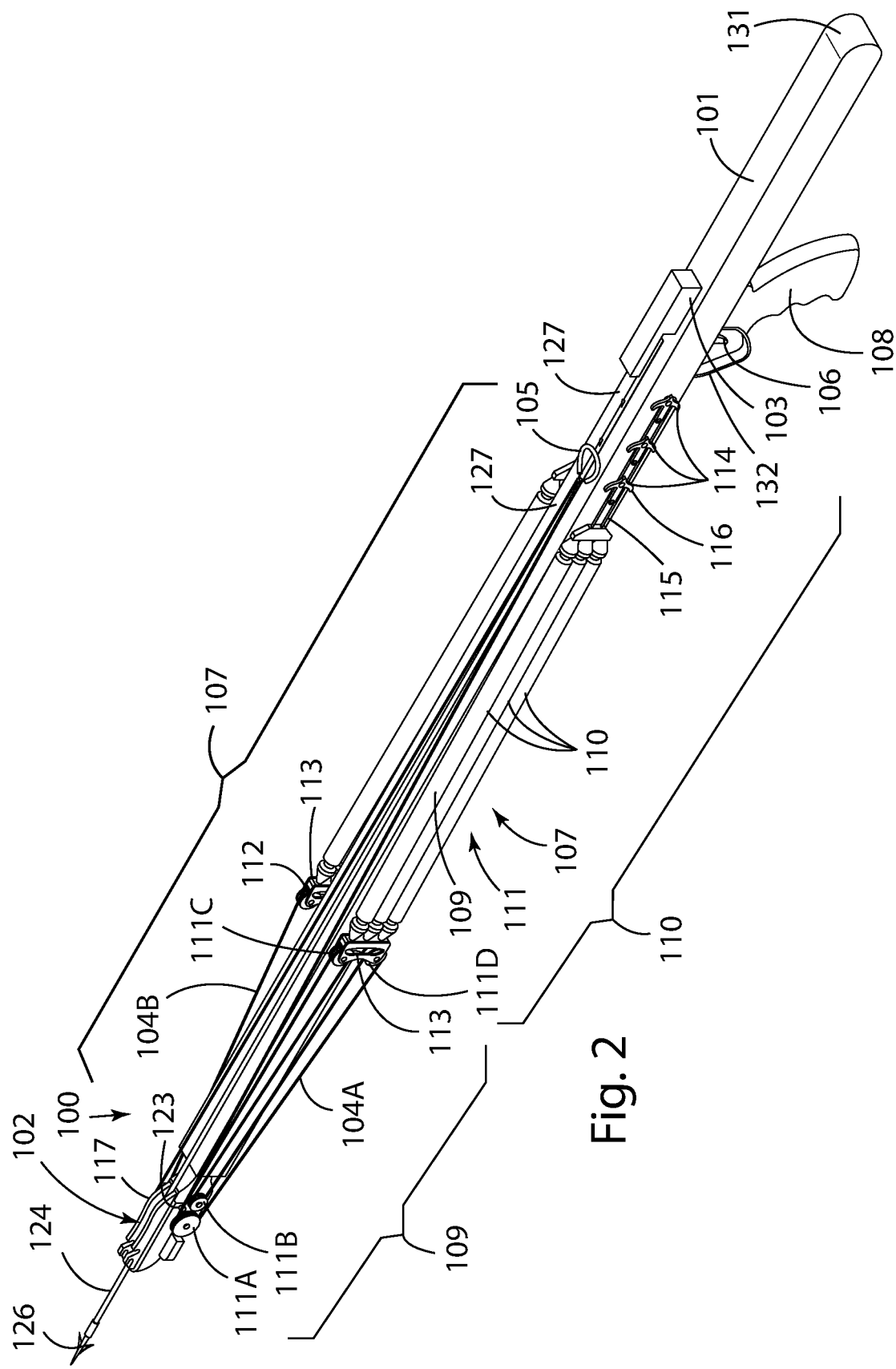
FIG. 2 illustrates a perspective view of a speargun in accordance with the present embodiment of FIG. 1.

The pulleys of the present embodiments may be configured for easy removal and may come in an array of one two or three pulleys. As shown in FIG. 1, two pulleys are positioned in the front and two in the rear, what are bracketed together and allow easy attachment one or more elastic bands (e.g., three bands shown in FIG. 1). The pulleys of the present embodiments may be made from rubber, plastics, composites, wood, metal and the like and combinations thereof. The stock may or may not have a butt (cf. 131 FIGS. 2 and 131i FIG. 34). The shape of the stock may start at the butt as a square 2 inch by 4 inch wood stock tapered as needed to accommodate, for example, up to 4 elastic bands on each side so that the combined band width total is no wider than the side of the speargun. Stock corners may also be rounded for a better look and easier movement in the water.

Figure 17:
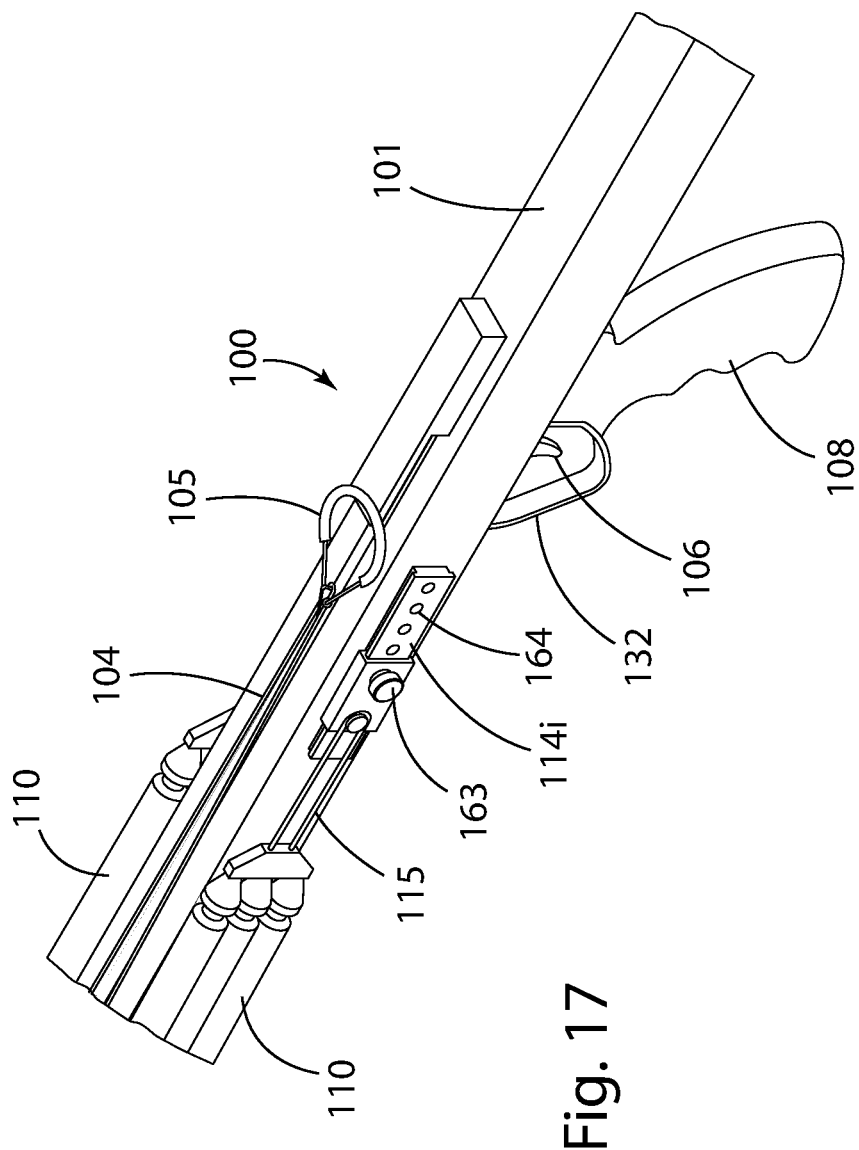
FIG. 17 illustrates a partial closeup perspective view of a proximal portion of a speargun in accordance with the present embodiment of FIG. 1 with the connector configured according to different approach with an adjustable track for elastic band tensioning.
Figure 21:
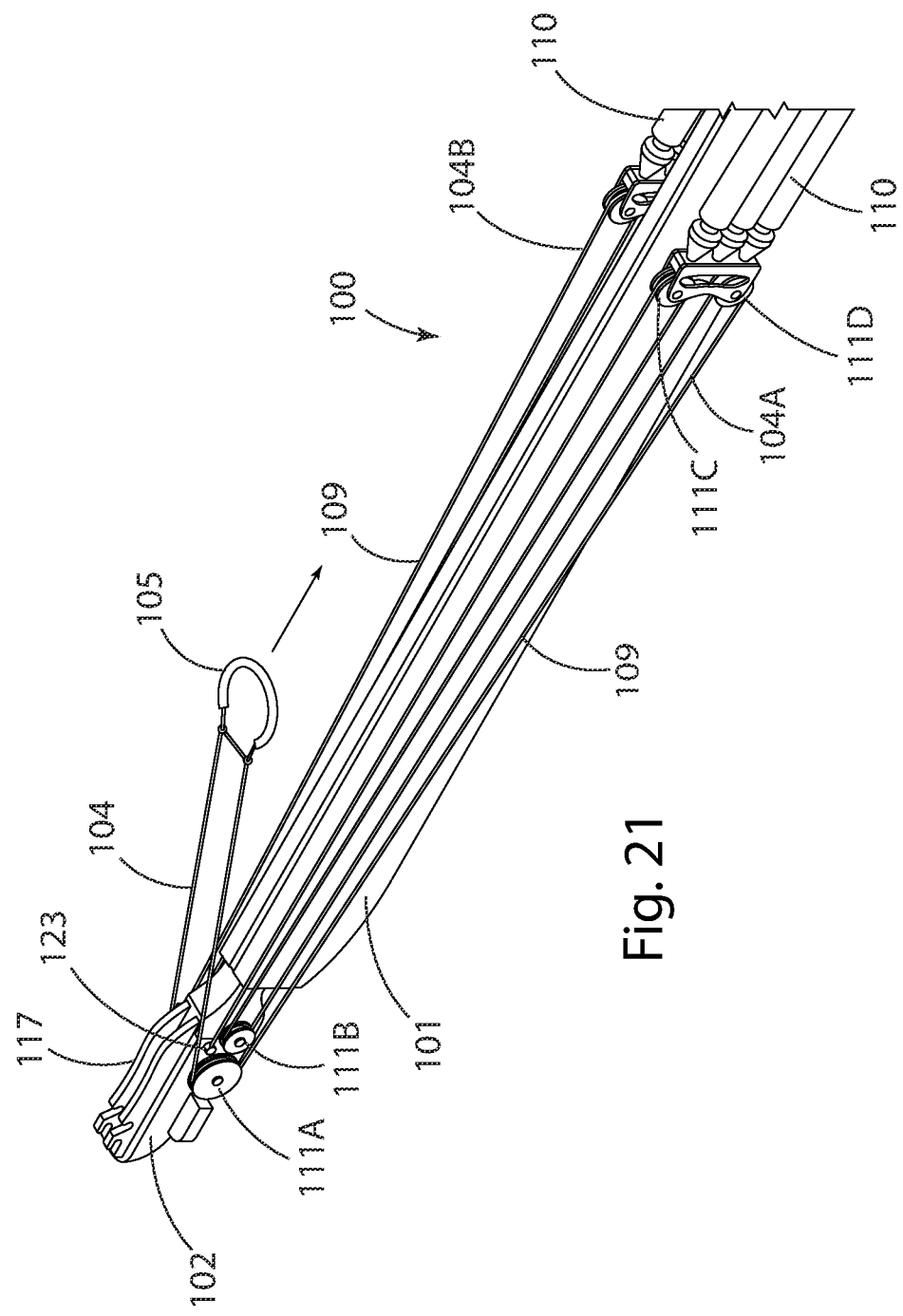
FIG. 21 illustrates a partial closeup perspective view of a distal portion speargun in accordance with the present embodiment of FIG. 1 with the tackle line being pulled to a cocked position.
Figures 22A, 22B, 22C, 22D, 22E, 22F:
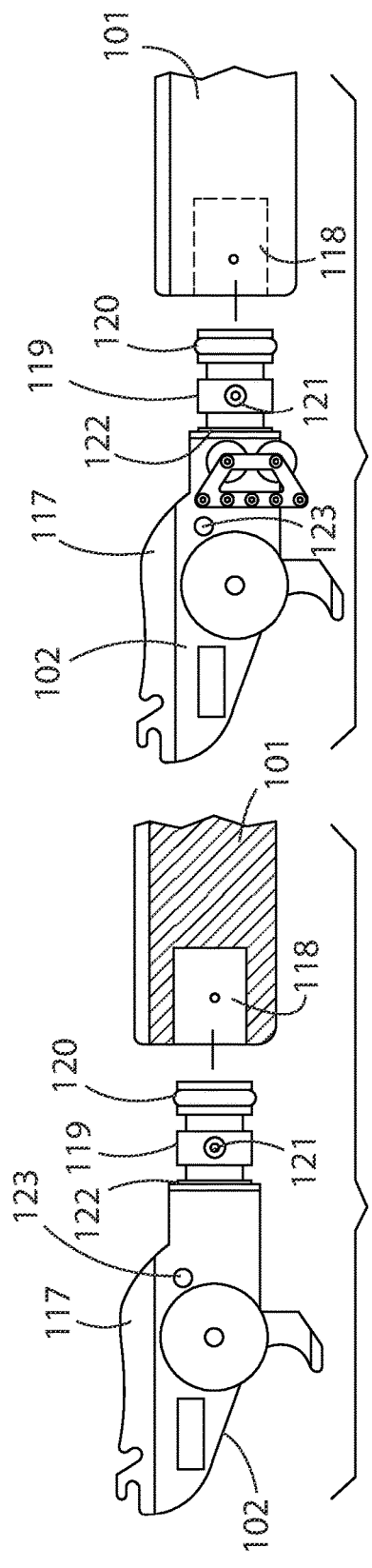
FIG. 22a illustrates a side elevation view of a speargun muzzle in accordance with one approach of the present embodiments.
FIG. 22b illustrates a side elevation view of a speargun muzzle in accordance with another approach of the present embodiments.
FIG. 22c illustrates a side elevation view of a speargun muzzle in accordance with another approach of the present embodiments.
FIG. 22d illustrates a side elevation view of a speargun muzzle in accordance with another approach of the present embodiments.
FIG. 22e illustrates a side elevation view of a speargun muzzle in accordance with another approach of the present embodiments.
FIG. 22f illustrates a side elevation view of a speargun muzzle in accordance with another approach of the present embodiments.

The stock may also have a variety of anchor points to the band assembly. The anchor points allow different power levels. For example, one may be an array of wings (ref. 114 FIG. 1) or in another embodiment a sliding track (ref. 114i FIG. 17) having a spring-loaded pin 163 that a user may pull and move to one of the holes configured to receive the pin 163. The further back the anchor point the more stretch and thus more power can be tensioned on the bands.

The variety of trigger mechanisms are possible to trip/deploy/release the tension of the tensioned bands. One such trigger mechanism may be found by one sold under the trade name ERMES Double Roller Trigger.

Turing now to the figures, a variety of embodiments of a spear gun 100 within the scope of the present invention is shown. A speargun has a stock 101 and a muzzle 102 at a distal end thereof. For orientational referencing, distal and the like will be used to describe the end of the gun 100 towards the muzzle 102 and proximal and the like used to describe the opposite side thereof.

The spear gun 100 also has a handle 108, a trigger mechanism 106, a trigger guard 132, a stock butt 131, and a catch 103 to hold the base of a spear. Optionally, stabilizing fins 113 may be added (See e.g., FIGS. 27-28) As shown, for example, according to one approach in FIGS. 1-12, two mirror image/bi-lateral tensioning mechanisms (elastic tackles) 107 are shown attached to stock 101. One component is the tackle 109 and at least one elastic band 110. Tackles 104 have band lines 104 (104A on one side and a mirror image 104B on the other side) attached to stock 101 at line anchor pin/points 123. Lines 104 thread through an array of pulleys 111 and extend to loop 105.

As shown, spear 124 has a shaft 129, an arrowhead 126, fins 127 to engage loop 105, and a notch 128 to engage the trigger mechanism. The arrow shaft is placed within stock groove 159 and its base under catch 103.

The speargun 100 comprises a pair of elastic tackles 107 either side of the stock 101. Each elastic tackle 107 has a tackle 109 tensioned by at least one elastic band 110. The tackle 109 comprises a plurality of pulleys 111 acting on the line 104. The tackle 109 is preferably a four-pulley tackle having a two-pulley proximal block 112 connected to a distal end of the at least one elastic band 110. The at least one elastic band is affixed to the stock 101 at a proximal end thereof.

Thus, tackles 107 are placed on both sides of the speargun 100 as part of the muzzle head 102. One end of line 104 is attached at the anchor point 123 on one side then threaded through the pulleys 111 on same side then across the muzzle 102 and thread through the pulleys 111 on the opposite side and finally second end of line 104 tied to the anchor point 123 on the opposite side of muzzle head 102. Line 104 may be one continuous line or separate lines for each side. The figures indicate line 104A and 104B to denote the portion of the line disposed on either side of the stock, which can be a single line or separate lines. As shown, anchor pin 123 is located on the muzzle head 102 between and above pulleys 111A and 111B as shown in at least illustrations FIGS. 1-12. Specifically, from anchor pin 123, line 104 wraps around upper pulley 111C and back to the top and around pulley 111B back to and around lower pulley 111D then back to under and straight up pulley 111A, from there crossing the top of muzzle head 102 and back down the opposite side pulley 111A and repeating the process to finally anchor line on unmarked, unnumbered muzzle head pin opposite anchor pin 123. The section of the line crossing the top of muzzle head 102 is the wishbone line 105 that engages into the fin 127 of the shaft 129 when pulled back.

The muzzle 102 and stock 101 cooperate to form a superior channel therealong within which the shaft of a spear is loosely held and engaged at a proximal end thereof by a catch 103. A wishbone 105 of a tensioned line 104 is pulled back to engage a dorsal fin 127 of shaft 129 such that, when catch 103 is released by pulling a trigger 106 of a handle 108, the tensioned line 104 throws the spear rapidly from the muzzle 102.

The two-pulley block 112 may comprise two pulleys 111 side-by-side respect to a longitudinal axis of the stock 101. The two-pulley proximal block 112 may have a metallic spreader 113 engaging the two pulleys 111 thereof.

The four-pulley tackle 109 has two distal pulleys 111 comprising a proximal pulley 111B and a relatively larger distal pulley 111A. Line 104 leaving the distal pulley 111A forms the wishbone 105. The line 104 may be anchored at an anchor pin 123 from which it goes on each side (with reference to FIG. 1) round upper pulley 111C, proximal pulley 111B, lower pulley 111D and up round distal pulley 111A to form the wishbone 105.

FIG. 1 shows wherein the at least one elastic band 110 is relaxed such that the line 104 goes over the muzzle 102 between each distal pulley 111A. When the gun 100 is loaded (FIG. 2), wishbone 105 goes rearwardly to engage the dorsal fin 127 of shaft 129 of spear 124 loaded therein wherein the distal pulley 111A gives clearance for the line 104 above the proximal pulley 111B. Where multiple pulley 111Bs are configured (e.g., FIGS., 15-16), they are mounted to muzzle 117 with muzzle pulley mounts 138.

The at least one elastic band 110 may have a plurality of parallel elastic bands 110. In the embodiment shown in FIGS. 1-12, speargun 100 comprises three elastic bands 110 for each elastic tackle 107 but, in embodiments two or four or more are envisaged also (See e.g., FIGS. 18-20).

The at least one elastic band 110 may be affixed to the stock 101 at a proximal end thereof by one of one or more pretension adjusting connection points 114. The proximal ends of the elastic bands 110 may comprise band loop loops 115 which can be looped over wings 116 a chosen connection point 114. Each connection point 114 may comprise wings 116 which secure over the apex of each band loop 115.

The muzzle 102 may be formed by a separate muzzle piece 117 separable from stock 101. As previously mentioned, stock 101 may be wooden and may comprise a distal blind hole 118 therein orientated along a longitudinal axis of the stock 101 within which a portion 119 of the muzzle piece 117 inserts. The muzzle piece portion 119 may have a bearing face or plate 122 which bears against a distal surface surrounding the blind hole 118.

The muzzle piece portion 119 may have a frictional enhancing O-ring 120. Furthermore, the muzzle piece portion 119 may comprise a screw hole 121 for affixing a retention screw going through the distal end of the stock 101. The muzzle piece 117 may comprise the aforedescribed two distal pulleys 111A and 111B, though this is not a requirement.

The tension of a loaded spear 129 is held by pinching spear 129 between catch 103 and spear hold 165. Spear hold 165 is pivotally attached to a spring 125 loaded trigger 106. When the triggering mechanism is pulled, spear hold 165 is lowered to allow spear 124 to escape. (See e.g., FIGS. 11-14)

Figure 23:
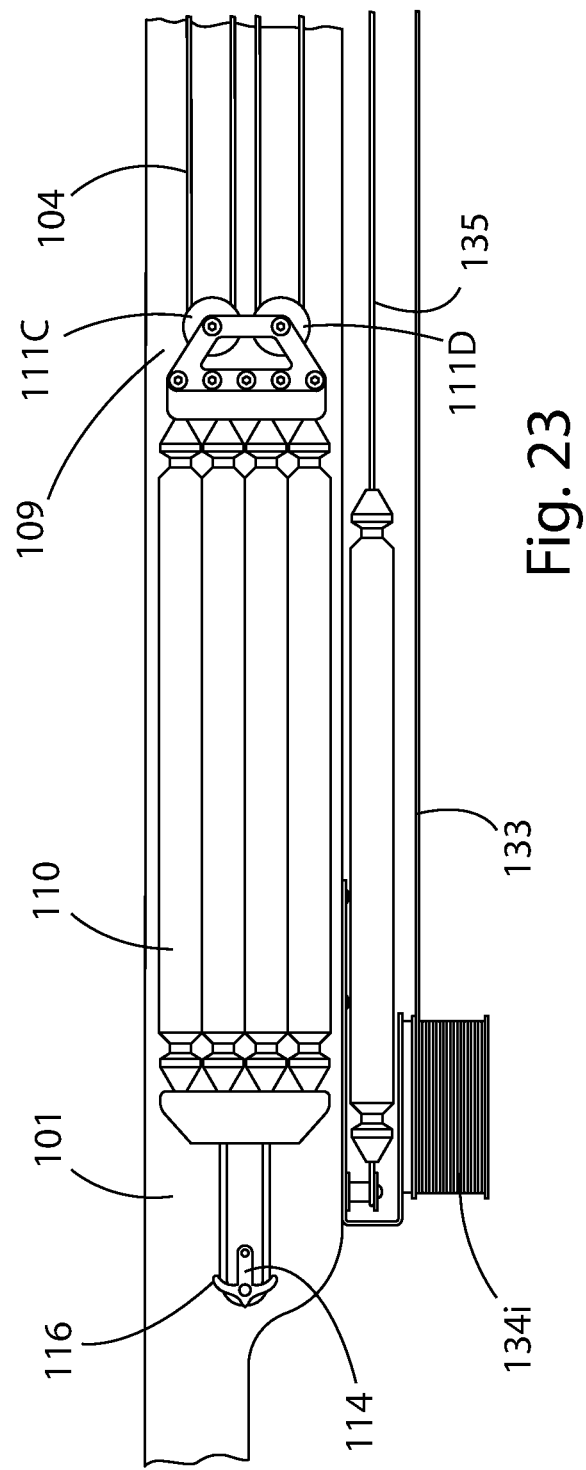
FIG. 23 illustrates a side elevation view of a speargun with the elastic tackle according to another one approach showing side and bottom elastic bands and reel.
Figure 26:
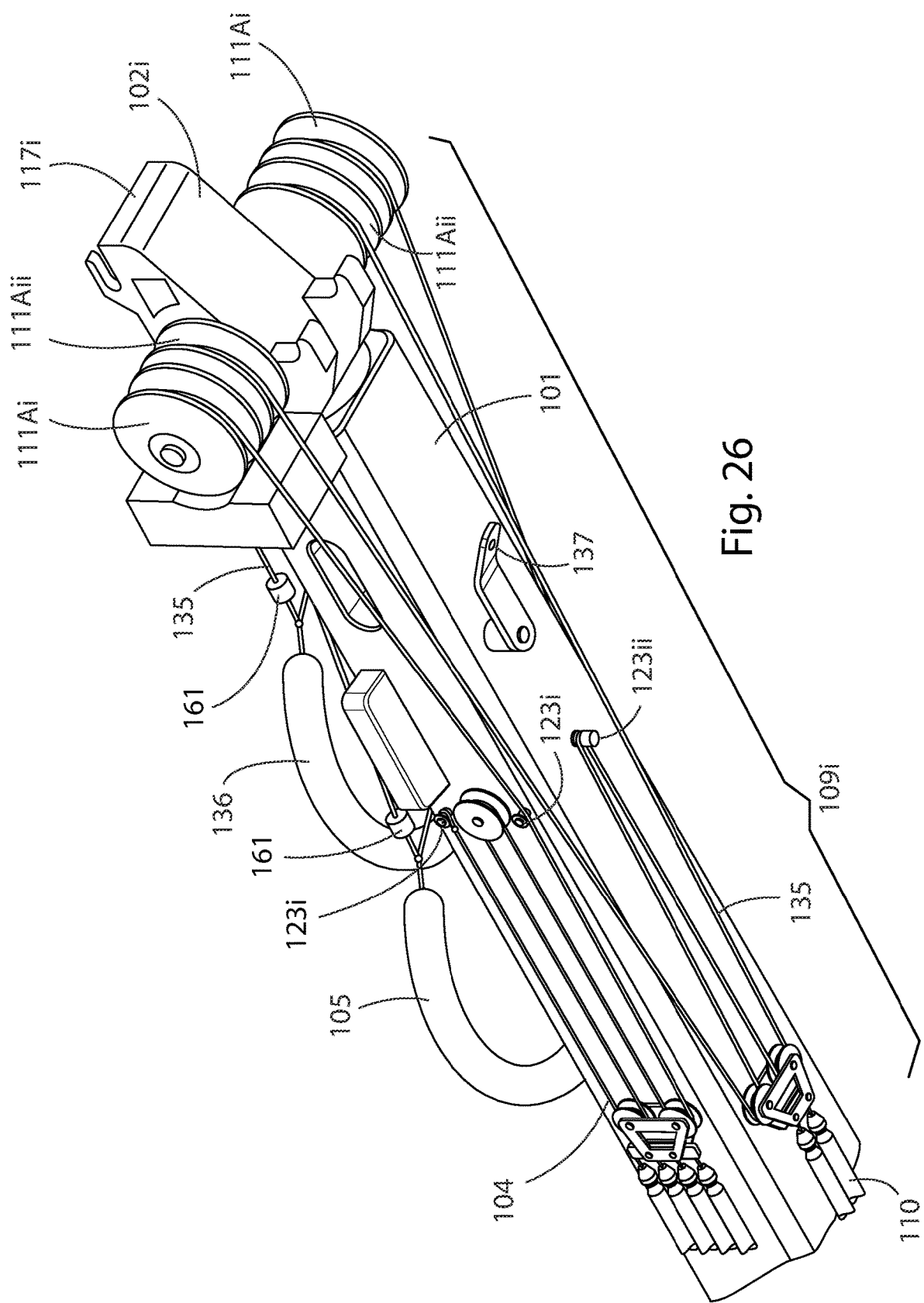
FIG. 26 illustrates a close up bottom perspective view of a speargun muzzle and elastic tackle in accordance with another approach of the present embodiments.
Figure 31:
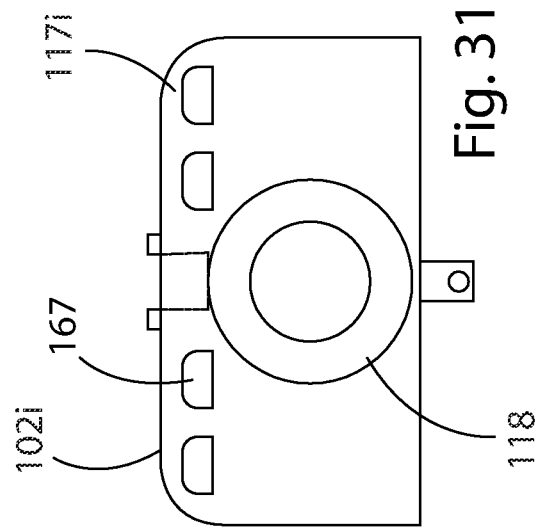
FIG. 31 illustrates a rear elevational view of a speargun muzzle in accordance with the embodiment of FIG. 29.
Figure 29:
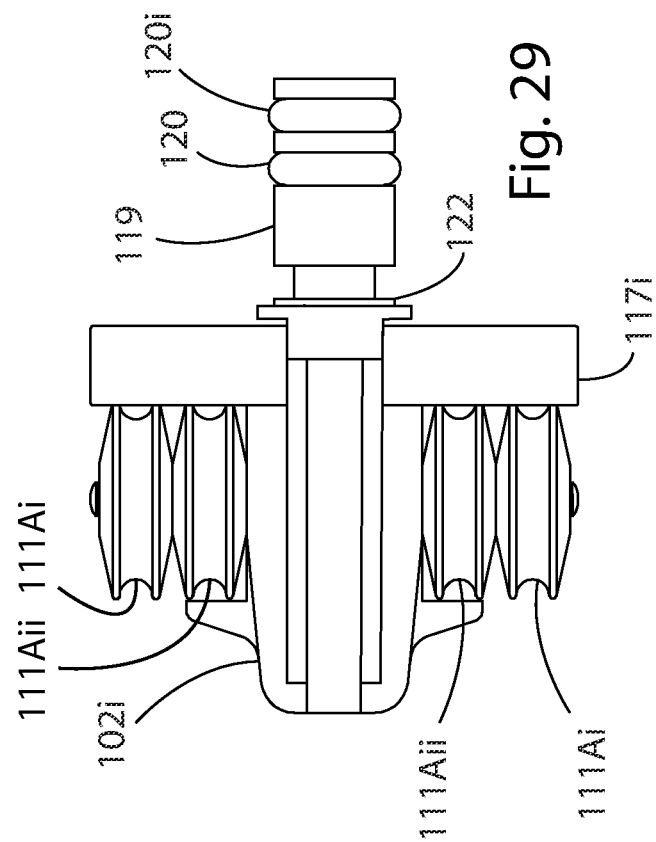
FIG. 29 illustrates a top plan view of a speargun muzzle in accordance with another approach of the present embodiments.
Figure 30:
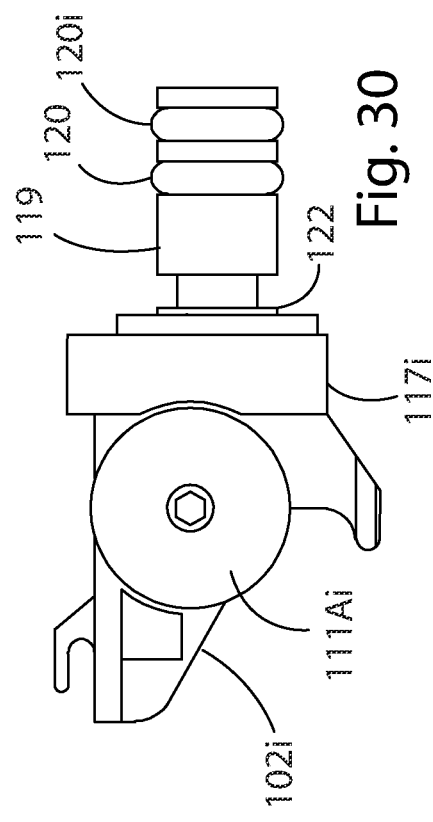
FIG. 30 illustrates a side elevational view of a speargun muzzle in accordance with the embodiment of FIG. 29; i

An optional spear line 133 may be attached to spear 124 with a spear line spool 134. See e.g., FIGS. 6 and 23, whereby spear 124 remains attached to stock 101 after deployment and threaded through guide 137 (FIG. 26).

In an alternate embodiment a second line 135 is attached to the bottom of stock 101 (See, e.g. FIG. 26) at a single anchor 123i threaded as shown through an inner pulley configuration 111Ai and 111Aii, and having a second wishbone 136. The wishbones may attach to the same dorsal fin 127 or alternately to a second fin 141 (FIG. 32). Similarly for the proximal pulley blocks, there may be a six-pulley tackle having a three-pulley proximal block 139 or a four pulley tackle having a two-pulley tackle having a one-pulley proximal block 140. Lines 135 may have stops 161.

As shown in FIGS. 38-41, an option front site 142 and rear site 143 may be added. As shown in FIG. 41, rear site 143 may, for example, have markings for distance reference mark 1 (e.g., 3 meter) 144; distance reference mark 1 (e.g., 6 meter) 145; and distance reference mark 1 (e.g., 9 meter) 146.

Figure 42:
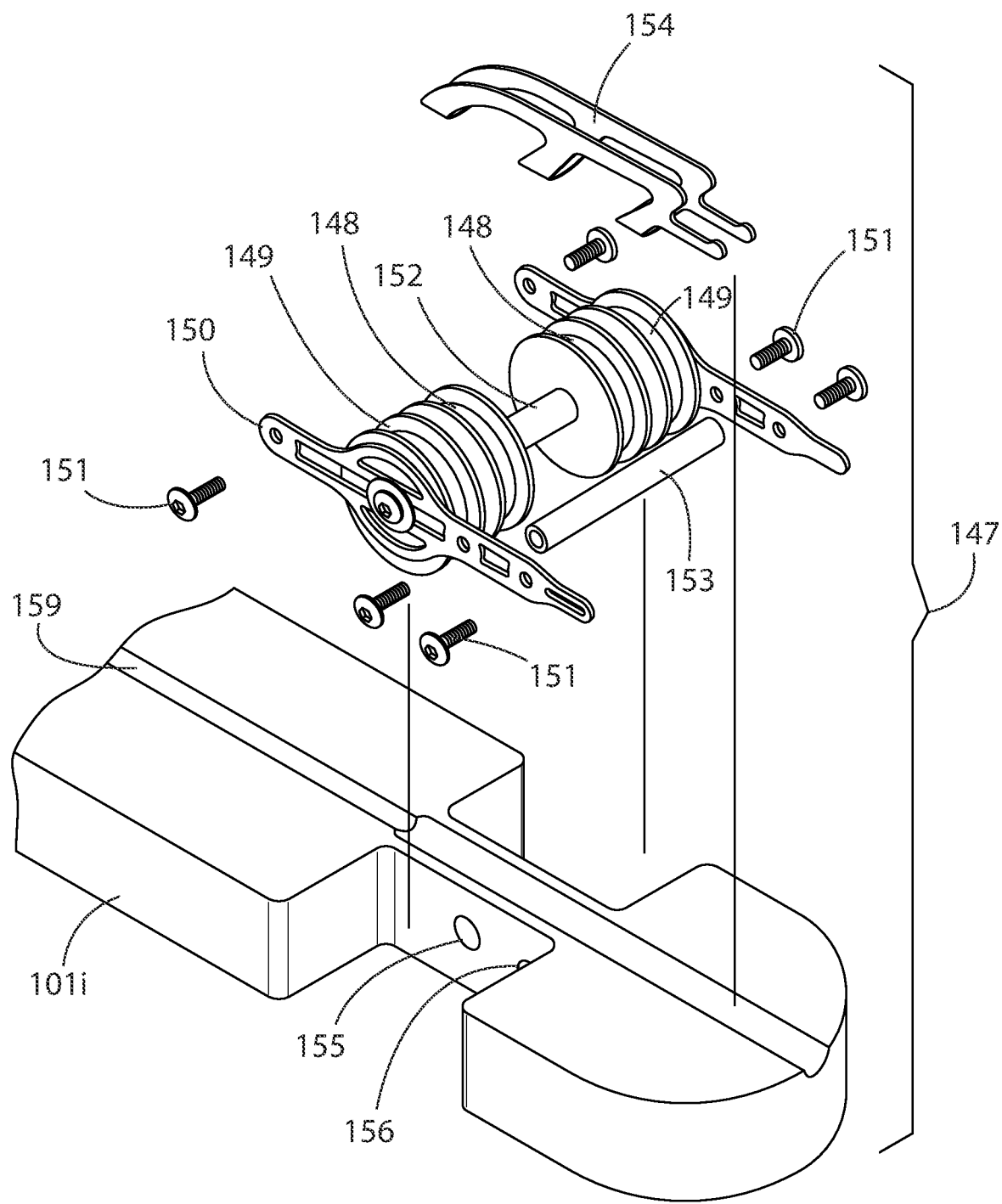
FIG. 42 illustrates an exploded top perspective view of an optional front muzzle assembly configured to attached to a stock 101i.
Figure 43:
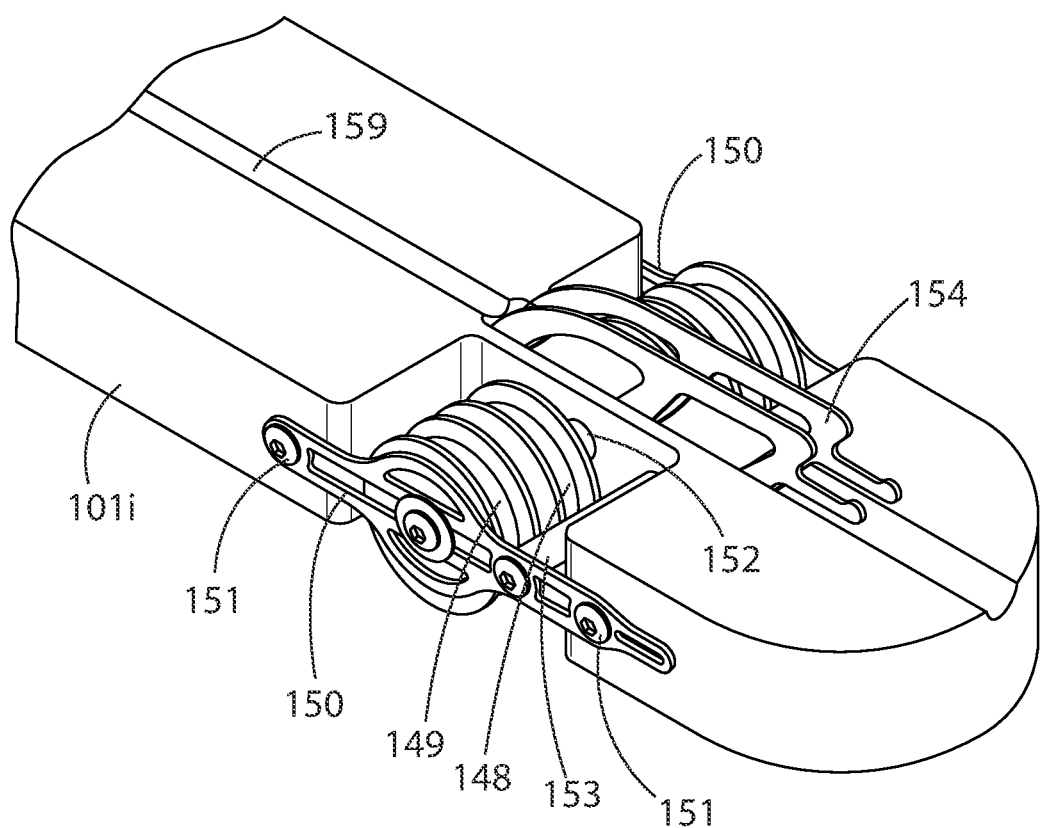
FIG. 43 illustrates a top perspective view of an optional front muzzle assembly of FIG. 42.
Figure 44:
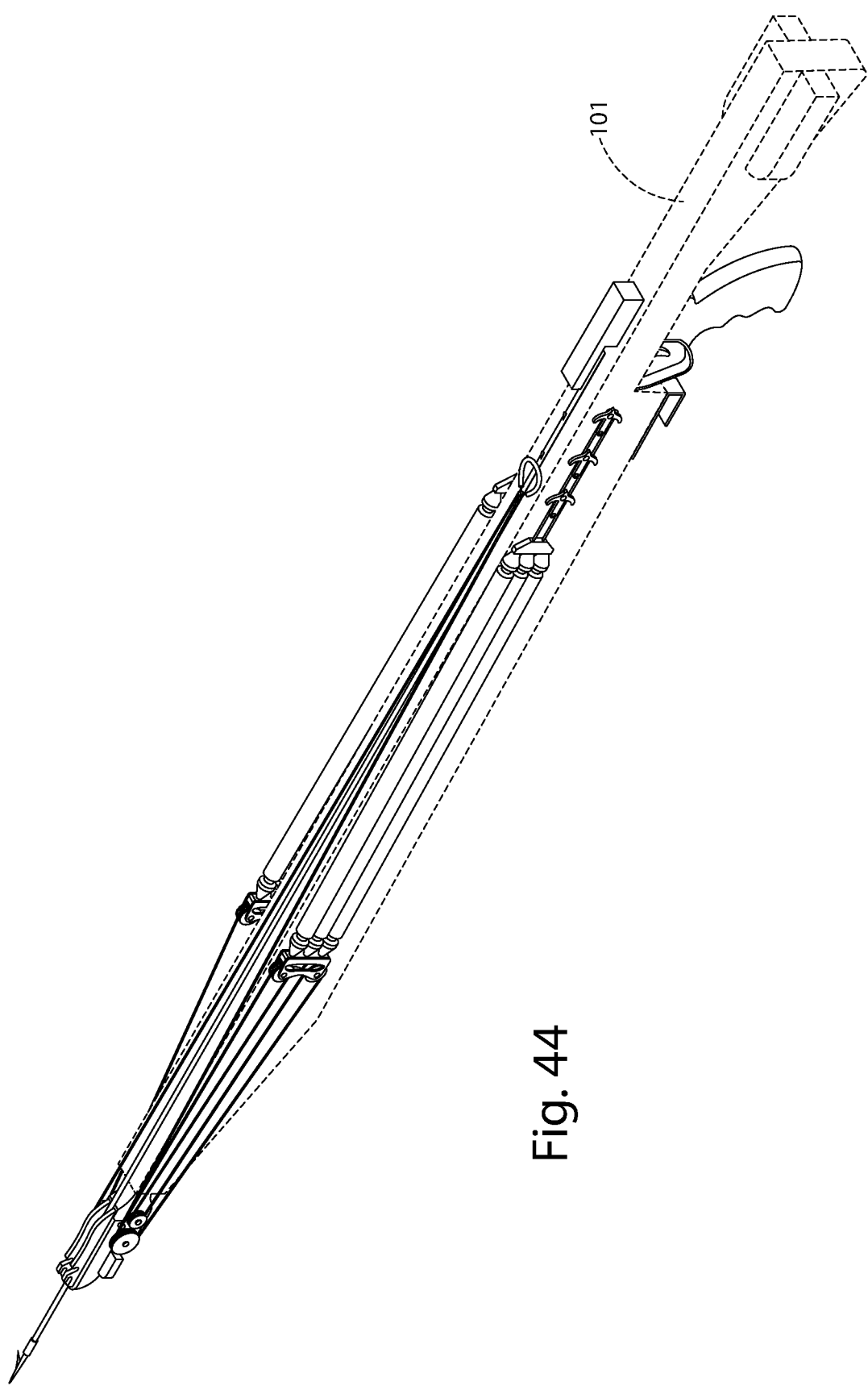
FIG. 44 illustrates components of a speargun kit ready to attach to a user's stock.

FIGS. 42 and 43 show an optional muzzle configuration 147 shows an assembly for direct attachment to stock 101 having inner pulleys 148; outer pulleys pulley 149; bracket to mount pulleys to stock 101i 150; screws to mount brackets 150 pulleys to stock 101i 151; pulleys axle 152; spacer 153; arrow guide 154; stock bore for axle 152; stock bore for spacer 156; and stock 101i arrow slot/groove 159. This embodiment is useful for two band lines with the inner and outer pulley arrangement 111i and 111ii and for easier stock development when a kit form is used, and the user makes their own stock.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention. The term "approximately" or similar as used herein should be construed as being within 10% of the value stated unless otherwise indicated.

While several embodiments of the present invention have been shown and described in detail, it to be understood that various changes and modifications could be made without departing from the scope of the invention.

The drawings and the foregoing descriptions are not intended to represent the only forms of assemblies in regard to the details of construction. Changes in form and in proportion of parts, as well as the substitution of equivalents, are contemplated as circumstances may suggest or render expedient. Throughout this specification and the drawings and figures associated with this specification, numerical labels of previously shown or discussed features may be reused in another drawing figure to indicate similar features.

List Of Reference Numbers 100 gun
101 stock
102 muzzle
103 catch
104 band line
105 loop (wishbone)
106 trigger
107 elastic tackle
108 handle
109 tackle
110 at least one elastic band
111 plurality of pulleys
112 four-pulley tackle having a two-pulley proximal block
113 metallic spreader
114 connection points
115 loops
116 wings
117 separate muzzle piece
118 distal blind hole
119 portion of muzzle piece 117 inserts
120 O-ring
121 screw hole
122 bearing face or plate
123 anchor pin
124 spear assembly
125 trigger spring
126 arrowhead
127 spear fins to engage line 104
128 arrow notch
129 spear shaft
130 stabilizing fins
131 stock butt
132 trigger guard
133 spear line
134 spear line spool
135 optional second line
136 optional second line wishbone
137 spear line guide
138 pulley 111B muzzle pully mounts
139 six-pulley tackle having a three-pulley proximal block
140 two-pulley tackle having a one-pulley proximal block
141 spear fins to engage second band line 135 (FIG. 32)
142 front site
143 rear site
144 distance reference mark 1 (e.g., 3 meter)
145 distance reference mark 1 (e.g., 6 meter)
146 distance reference mark 1 (e.g., 9 meter)
147 alternate muzzle pully assembly for direct attachment to stock
148 inner pulleys (FIGS. 42 and 43)
149 outer pulleys pulley (FIGS. 42 and 43)
150 bracket to mount pulleys to stock 101*i* (FIGS. 42 and 43)
151 screws to mount brackets 150 pulleys to stock 101*i* (FIGS. 42 and 43)
152 pulleys axle (FIGS. 42 and 43)
153 spacer (FIGS. 42 and 43)
154 arrow guide (FIGS. 42 and 43)
155 stock bore for axle 152 (FIG. 42)
156 stock bore for spacer 153 (FIG. 42)
157 (FIGS. 42 and 43)
158 (FIGS. 42 and 43)
159 stock 101*i* arrow slot/groove (FIGS. 42 and 43)
160 hook
161 stop
162 longitudinal axis
163 spiring loaded pin
164 holes to receive spring loaded pins
165 spear hold
167 line holes

I claim:

1. A speargun comprising:
a stock having a distal end and a proximal end,
a muzzle at a distal end thereof,
a band line having a first end and a second end attached on either side of the stock at its distal end respectively and a middle wishbone portion configured to releasably attach to a spear,
matching compound tackle assemblies using the band line attached on the stock distal end at a tackle assembly first end on either side of the stock and which each are attached at a tackle assembly second end to at least two elastic bands on a first elastic bands side, the at least two elastic bands attached at a proximal stock end on a second elastic bands side a;
wherein each compound tackle assembly comprises an at least four-pulley tackle,
the at least four-pulley tackle having an immoveable two-pulley block attached at the distal stock end and arranged side by side with respect to a longitudinal axis of the stock;
the at least four-pulley tackle having a movable at least two pulley block attached to the at least two elastic bands,
wherein the band line is configured to connect each of the immovable two-pulley blocks to their respective movable at least two pulley block in a compounding leveraging fashion on each side, and wherein compounding tension of the middle wishbone portion of the band line is created as it is moved proximally from the stock distal end.

2. The speargun as claimed in claim 1, wherein the immoveable two-pulley block comprise a proximal pulley and a relatively larger distal pulley.

3. The speargun as claimed in claim 2, wherein the at least two elastic bands are detachably and movably affixed to the stock at a proximal end thereof by one of one or more pretension adjusting connection points, the connection points in longitudinal alignment with respect to a longitudinal axis of the stock.

4. The speargun as claimed in claim 3, wherein the connection points are located such that the at least one elastic band is stretchable from a first relaxed length to a second tension length, wherein the second tension length is between 100% and 200% of the first when the speargun is loaded.

5. The speargun as claimed in claim 1, wherein the at least two elastic band comprises at least three elastic bands in parallel.

6. The speargun as claimed in claim 1, wherein the muzzle is formed by a muzzle piece separable from the stock.

7. The speargun as claimed in claim 6, wherein the stock comprises a distal blind hole therein orientated along a longitudinal axis of the stock within which a portion of the muzzle inserts.

8. The speargun as claimed in claim 7, wherein the stock is wooden.

9. The speargun as claimed in claim 6, wherein the muzzle piece has pulleys of the immoveable two-pulley block.

10. The speargun as claimed in claim 1, further comprising a third elastic tackle assembly disposed on a bottom of the stock.

11. A method of loading a speargun as claimed in claim 1, the method comprising pulling the wishbone from the muzzle, wherein the wishbone is tensioned by the pair of elastic tackles either side of the stock.

\* \* \* \* \*